(12) United States Patent
Mataya et al.

(10) Patent No.: US 7,409,920 B2
(45) Date of Patent: Aug. 12, 2008

(54) BOAT HULL AND METHOD OF MANUFACTURE

(75) Inventors: Robert F. Mataya, Nixa, MO (US); Tommy Morphis, Springfield, MO (US)

(73) Assignee: Tracker Marine, L.L.C., Springfield, MO (US)

( * ) Notice: Subject to any disclaimer, the term of this patent is extended or adjusted under 35 U.S.C. 154(b) by 75 days.

(21) Appl. No.: 11/428,160

(22) Filed: Jun. 30, 2006

(65) Prior Publication Data
US 2007/0013109 A1 Jan. 18, 2007

Related U.S. Application Data

(63) Continuation-in-part of application No. 10/795,858, filed on Mar. 8, 2004, now Pat. No. 7,160,498.

(51) Int. Cl.
*B63B 5/24* (2006.01)
*B29C 45/00* (2006.01)

(52) U.S. Cl. ........................ 114/357; 264/510

(58) Field of Classification Search ................. 114/357
See application file for complete search history.

(56) References Cited

U.S. PATENT DOCUMENTS

| | | | |
|---|---|---|---|
| 2,495,640 A | 1/1950 | Muskat |
| 2,913,036 A | 11/1959 | Smith |
| 3,004,295 A | 10/1961 | Bottoms et al. |
| 3,137,898 A | 6/1964 | Geringer |
| 3,342,787 A | 9/1967 | Muskat |
| 4,132,755 A | 1/1979 | Johnson |
| 4,238,437 A | 12/1980 | Rolston |
| 4,311,661 A | 1/1982 | Palmer |
| 4,312,829 A | 1/1982 | Fourcher |
| 4,359,437 A | 11/1982 | Le Comte |
| 4,622,091 A | 11/1986 | Letterman |
| 4,759,893 A | 7/1988 | Krauter |
| 4,873,044 A | 10/1989 | Epel |
| 4,886,442 A | 12/1989 | McCowin et al. |
| 4,902,215 A | 2/1990 | Seeman, III |
| 4,942,013 A | 7/1990 | Palmer |
| 4,975,311 A | 12/1990 | Lindgren |
| 5,052,906 A | 10/1991 | Seeman |
| 5,316,462 A | 5/1994 | Seeman |
| 5,354,195 A | 10/1994 | Dublinski et al. |
| 5,439,635 A | 8/1995 | Seemann |
| 5,464,337 A | 11/1995 | Bernardon et al. |
| 5,576,030 A | 11/1996 | Hooper |
| 5,588,392 A | 12/1996 | Bailey |
| 5,601,852 A | 2/1997 | Seeman |
| 5,702,663 A | 12/1997 | Seeman |
| 5,716,488 A | 2/1998 | Bryant |
| 5,721,034 A | 2/1998 | Seeman, III et al. |

(Continued)

FOREIGN PATENT DOCUMENTS

GB 1432333 4/1976

*Primary Examiner*—Jesús D Sotelo
(74) *Attorney, Agent, or Firm*—Husch Blackwell Sanders LLP

(57) ABSTRACT

A boat hull is provided that has a substantially seamless construction wherein the boat hull is an integral monolithic structure. In the formation of the boat, the boat interior components for example deck precursors are positioned in the mold prior to formation of the hull so that the boat hull can be made in a one shot molding process.

50 Claims, 13 Drawing Sheets

U.S. PATENT DOCUMENTS

| | | |
|---|---|---|
| 5,770,243 A | 6/1998 | Butterworth |
| 5,904,972 A | 5/1999 | Tunis, III et al. |
| 5,958,325 A | 9/1999 | Seeman, III et al. |
| 6,286,448 B1 * | 9/2001 | Sahr et al. .................. 114/357 |
| 6,723,273 B2 | 4/2004 | Johnson et al. |
| 6,773,655 B1 | 8/2004 | Tunis, III et al. |
| 2003/0122285 A1 | 7/2003 | Crane et al. |
| 2005/0086916 A1 | 4/2005 | Caron |

* cited by examiner

# BOAT HULL AND METHOD OF MANUFACTURE

CROSS-REFERENCE TO RELATED APPLICATION

This application is a continuation-in-part of application Ser. No. 10/795,858 filed Mar. 8, 2004 now U.S. Pat. No. 7,160,498 to Robert F. Mataya and Tommy Morphis entitled Closed Molding Tool; the entire disclosure of which is incorporated herein by reference.

BACKGROUND OF THE INVENTION

Fiber reinforced boat hulls are common in the industry. Typically, they are made by a molding process that involves depositing (laying up) a layer of fibers, either as chopped fibers or a woven or knit mat of fibers, in a mold and then impregnating the fiber layer(s) with a resin which upon curing will provide water impermeability to the fiber and rigidity. Typically, such a boat hull is made in several steps of fiber deposition and curing steps, particularly when the boat hull has internal features such as a working deck, live wells, water collection sumps and other molding formed features. Often, the elements forming each feature of the boat are produced in a separate molding step which then requires a separate curing step. Also, such boat hulls typically have a finish coat on the exterior surface that contacts the water to provide both aesthetic appeal and a smooth finish. Such finishes may be in the form of a gel coat. Also, it is common to provide flotation chambers formed in the boat hull which are sealed from the outside atmosphere and may be filled with a flotation material such as a closed cell foam. Boat hulls of this type and their method of manufacture are well known in the art.

However, the method of manufacturing of such boat hulls is time consuming and complex. Additionally, the boat hull has many formed seams between the various components of the finished boat hull. For example, a seam is formed between the outside edge of the working deck and the main portion of the boat hull. These seams may be formed by joining the two components together during a secondary molding step or forming the parts separately and adhesively joining them together. In any event, such process is inherently inefficient because of the multiple steps of assembly and/or molding involved and curing between assembly steps. Additionally, the seams at the joints between the various components each provide an opportunity for leakage or lack of structural integrity.

Typically, the boat hull manufacturing process involves the use of at least one mold half and sometimes two mold halves for closed molding, the female mold half or sometimes referred to as the A mold and the male mold half, sometimes referred to as the B mold. When the hull forming assembly steps are performed sequentially, e.g., forming a hull and then forming a deck in the hull, additional and different mold parts may be required to effect the total assembly further increasing inefficiency and cost.

The production of fiber reinforced composite components, and in particular those components formed of a fiber/resin combination, have traditionally been accomplished by a number of open and closed molding lamination processes, or variations of each. Examples of these components include those used in the boating industry; such as fiber reinforced plastic sheets and parts with a compound shape used to manufacture a hull for a watercraft. These molding processes all involve a fiber reinforcement (e.g., fiberglass pieces) being laid up against a mold (e.g., a female mold) that provides the desired shape for the component, and the impregnation of the fiber with resin or a similar material. After curing, the resin/fiber combination forms a finished part that can be removed from the mold. Apart from these similarities, however, molding processes are distinct in the efficiencies provided by each, as well as in the disadvantages or tradeoffs encountered when choosing a molding process for fabricating a specific type or run of a component.

Vacuum bag molding is a type of closed molding technique that involves forming a thin flexible bag to cover the mold half upon which the fiber lay-up is positioned. The edges of the bag are then clamped, taped or otherwise secured to the mold to form a sealed envelope surrounding the fiber layup. One or more vacuum supply lines are usually installed within the bag to apply a vacuum on the bag interior concomitant with catalyzed liquid plastic or resin being introduced into the bag through a resin supply line to impregnate the fiber layup. The vacuum draws the bag against the resin/fiber combination and surface of the mold to shape the combination into the desired part. The resin supply lines are typically positioned to introduce resin either at the perimeter of the part such that the vacuum supply line draws the resin across and through the fiber lay up towards the center of the part, or vice versa, with the resin introduced at the center of the part and vacuum drawing the resin towards the perimeter of the part. Vacuum bag molding can usually be categorized as either utilizing, (1) a thin disposable bag made from sheet film, or (2) a reusable bag made from silicone, both of which are flexible bags. Because the resin and fiber are essentially sealed off from the surrounding environment, vacuum bag molding techniques expose tool operators to significantly fewer VOC's than with open molding processes, which is a significant reason why vacuum bag techniques have gained interest in recent years.

When using a disposable vacuum bag, a peel ply release film and a resin flow/bleeder media must often be stacked atop the fiber lay up below the bag because of the nature of the thin sheet film to conform very tightly to the fiber layer up and make resin flow very difficult. The resin flow/bleeder media facilitates flow of the resin across and through the fiber lay up in a timely manner by essentially forming a resin passageway, and the peel ply film ensures that both the media and peel ply layer itself may be easily pulled off of the finished part without undue effort. Additionally, resin and vacuum distribution lines extending from the supply lines and routed beneath the vacuum bag across the mold are often needed in addition to the resin flow/bleeder media to properly distribute the resin and apply the vacuum draw beneath the tightly drawn thin sheet film. Also, adhesive sealant tape is typically applied around the perimeter of the bag to form an airtight seal with the mold and facilitate proper vacuum operation.

Despite the high quality of the part produced using disposable vacuum bag molding techniques (i.e., having a high fiber to resin ratio), certain disadvantages are apparent. For example, many of the aforementioned components used in disposable vacuum bag techniques—including the vacuum bag having resin and vacuum supply lines integrally formed therewith, the resin flow/bleeder media, the peel ply film, the resin and vacuum distribution lines and the adhesive sealant tape—are disposed of after molding only a single part, making this technique prohibitively expensive for all but high margin parts manufacturing. Significant labor is also necessary when using a disposable bag, as the bag must be made by hand to fit the particular base mold and also installed by hand with the resin flow/bleeder media, peel ply film, resin and vacuum distribution lines and sealant tape at the proper positions for the vacuum draw and resin impregnation of the fiber lay up to work Furthermore, if the female mold has a complex shape, many pieces of sheet film may need to be cut and bonded together with sealant tape to produce a bag with the desired shape, thereby significantly increasing manufacturing time per part as compared to open molding processes.

Yet another closed resin transfer molding process involves using rigid male and female molds together to produce fiber reinforced composite parts. A fiber lay-up is placed on the female mold and the male mold is brought into contact with the female mold and clamped or otherwise secured therewith so that a closed space is formed between the molds. Then, a mixed resin and catalyst are injected into the closed space under relatively low pressure. Upon curing of the resin, the molds are separated and the part is removed. The resin transfer molding process is more environmentally friendly than traditional open molding processes, with the capture of any VOC's present in the closed space occurring before the molds are separated to reveal the finished part. One significant disadvantage of resin transfer molding, however, is that because the male and female molds are rigid, if the fiber load of the lay up is not precisely the correct quantity at the correct position, structural weakness in the part occur. For example, "dry spots" occur where the resin cannot flow to an area during the injection process if the fiber density is too high, and if the fiber density is too low, a spot filled with resin and little fiber will develop. Both dry spots and resin filled spots in finished parts are susceptible to fracture or other structural failures at relatively low force loads. These structural weaknesses are even more important when fabricating large parts, such as boat hull components, where the weight of the part itself may facilitate structural failures. Matched, rigid tooling is very expensive to produce and, therefore, the process is less amenable to changes that may be required for structural, process, or styling updates. Rigid tooling molding can result in a higher resin to fiber ratio and weaker parts for a given weight of molded part.

Current closed molding lamination techniques do not provide an economical and reliable solution for fabricating fiber reinforced composite parts, especially with respect to small to medium part runs.

U.S. Pat. No. 6,367,406 discloses a boat and method of manufacturing using a rigid mold, both the male and female halves of the mold are rigid. The boat includes a hull and an internal deck. The internal deck has opposite side chambers containing foam therein. The chambers are formed by a portion of the bottom wall, a floor or top wall and a sidewall extending upwardly from the bottom wall and adjoining the top wall. When the boat is formed, transverse members are formed as an integral part of the structure which can best be seen in FIG. 3. The foam inserts have transverse members that adjoin in the middle which are then covered with fiber which is then infused with resin. The patent specifically requires a seamless construction. The transverse supports extend width wise across the hull and are configured for providing structural reinforcement to the hull. It is specifically required that the support structure, i.e., deck and transverse member forming portions and the hull are preferably formed as a single unitary or monolithic piece such that no seams are discontinuities are located between the two structures. It is also disclosed that there are preferably no separate fasteners or adhesives provided at the connection locations of the various parts of the hull with the connections between the various portions consisting of continuous uninterrupted thicknesses of fiber reinforced plastic material. It is also specifically disclosed that the support structure which includes the transverse supports are simultaneously molded as a single piece within the molding cavity. Further, it is disclosed that the resin is injected under pressure into the mold chamber with the mold members being semi rigid membranes that are capable of at least slightly flexing when pressurized resin is injected into the mold chamber. However, the transverse members formed discontinuities in the walls defining opposite sides of chambers between the deck portions. Stress risers are also provided where there are discontinuities between the fiberglass resin combination and the foam insert. It is believed that this structure, as disclosed, derives the majority of its compressive and tensile strengths from the fiber/resin laminate necessitating thicker and heavier laminates with concentrated stresses in places where the laminates are not continuous.

The present invention overcomes these difficulties by providing a one step or one shot molding process to form a relatively complete boat hull with the various interior portions of the boat hull, for example, the working deck, formed as a monolithic and integral structure with substantially seamless component joiner of certain of the major components. The molding process also permits easy formation of desired seams at desired locations with simple tooling during a single step molding process. The boat hull and working deck form the major portion of the finished boat or boat precursor. One or more partitions may be easily added between working deck components after forming the hull and working deck.

SUMMARY OF THE INVENTION

The present invention involves the provision of a method of forming a boat hull utilizing a single step molding process to form major components of the boat precursor at one time. The method may include forming a layer of reinforcement in a first mold portion to form a boat bottom precursor. A deck forming and supporting insert is placed on the hull reinforcement at a desired location with a deck insert extending along a substantial portion of the length of the boat bottom precursor. Resin is thereafter infused into the reinforcement through application of vacuum and at least partially encoring the deck insert in resin forming an integral structure of reinforcement of resin and deck insert having preformed discontinuities in the resin/fiber of the decks as desired. The resin then hardens and the rigid boat hull with deck(s) is removed from the first mold portion. The deck insert can function as a structural reinforcing element for the boat hull and boat.

The present invention also involves the provision of a boat hull that has a bottom portion, side portions, bow portion and a stem portion forming an open top cavity. The bottom, side, bow and stem portions are integral with one another. The precursor includes a deck insert, and a working deck in the boat cavity extending along a substantial portion of the length of the cavity between the bow and the stem portions. The working deck is preferably integral with at least two of the bottom portion, side portions, bow portion and stem portion and has a continuous upstanding sidewall defining one side of a channel. The deck insert at least partially forms an interior chamber with the boat hull.

The formed hull preferably has no integrally formed and more preferably no transverse structural members. The internal deck support structure can be of a closed cell structural foam that is designed to reinforce the deck fiber/resin components to resist deformation from dynamic compressive loads in the composite structure. The fiber/resin components can then be made thinner and lighter and still be adequate for tensile loads.

DETAILED DESCRIPTION OF THE INVENTION

Figure 1:
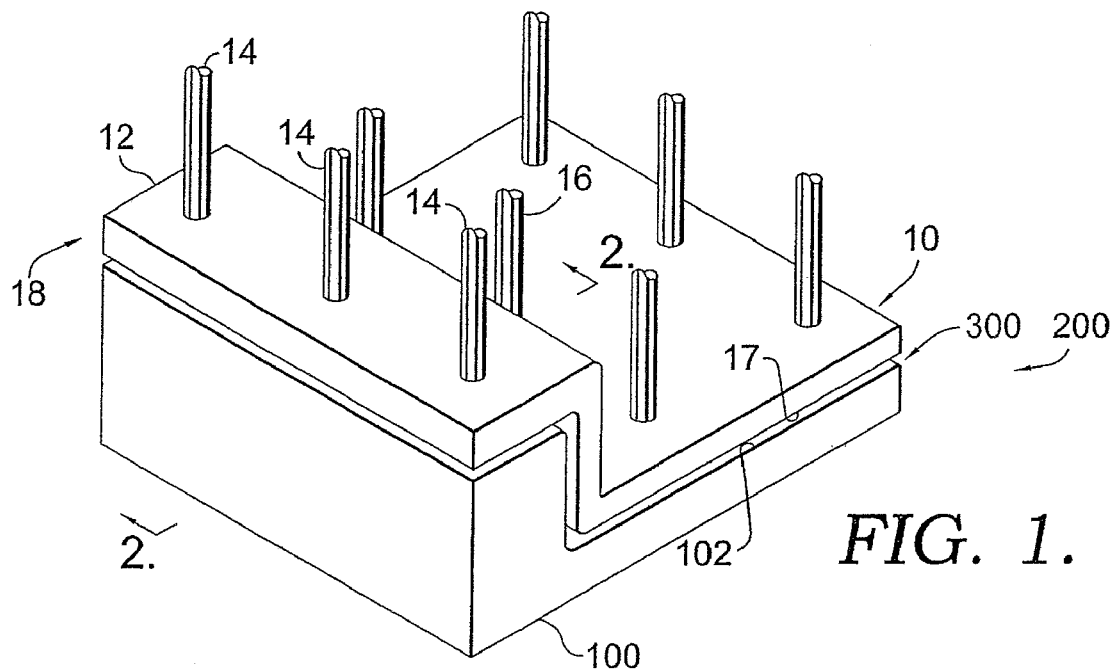
FIG. 1 is a perspective view of a molding component of the present invention interfacing with a base mold to form a fiber reinforced composite part.

The present invention improves on the materials and techniques implemented in traditional vacuum bag molding by providing, in a closed molding process, a flexible molding component or tool configured for use with a base mold tool to form a fiber reinforced composite part. With reference to FIG. 1, a flexible molding component 10 is shown in use with a base mold 100—in this particular example, a rigid female mold—to form a closed molding tooling system 200 for part fabrication. The base mold 100 may also be referred to as an "A" surface tool (female mold) while the molding component 10 may also be referred to as a "B" surface tool (male mold), regardless of which surface tool would be considered either a male mold or a female mold is a specific tooling configuration.

Figure 2:
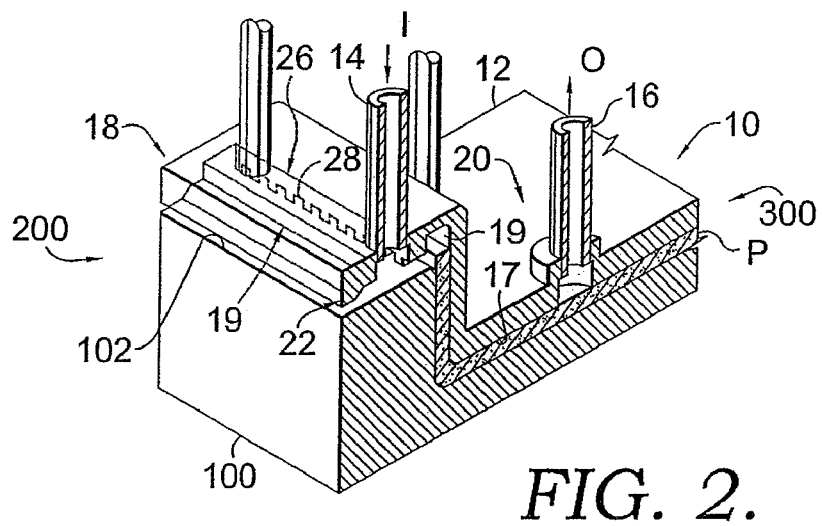
FIG. 2 is a perspective cross-sectional view taken along line 2-2 of FIG. 1 showing the molding component with a resin input port, a vacuum output port, a resin distribution channel, a standoff having a plurality of passages, and a perimeter seal.

The molding component 10, seen in more detail in FIG. 2, is formed of a flexible body structure 12 having integrally formed therewith one or more resin input ports 14 for delivering resin (e.g., polyester resin) to a space 300 that is enclosed for molding and is defined between the flexible body structure 12 and the base mold 100 where a fiber layup (e.g., fiberglass or other reinforcing fiber) is disposed, and one or more vacuum output ports 16 for drawing the body structure 12 into contact with a surface 102 of the base mold 100 to shape resin/fiber combination into a finished part. Additionally, on an interfacing surface 17 of the component 10 which interfaces with a surface 102 of the base mold 100, one or more resin distribution channels 19 and one or more vacuum distribution channels 21 are formed into the surface 17 to promote the consistent flow of resin across and through the fiber lay up under the influence of a vacuum draw. As seen in FIG. 2, the resin distribution channels 19 may provide fluid communication between adjacent resin input ports 14, and likewise the vacuum distribution channels 21 may provide fluid communication between adjacent vacuum output ports 16. Additionally, in some molding processes conducted with an embodiment of system 200, either of the resin distribution channels 19 or the vacuum distribution channels 21 may be omitted from the component 10, so long as adequate resin flow and vacuum pressures may be achieved from having only one type of distribution channel (i.e., resin or vacuum) incorporated into the component 10.

As those of skill in the art appreciate with respect to closed molding techniques, resin can be delivered to the molding component 10 for flowing from the center of the component 10 to the perimeter or edge thereof, or the resin can be flowed from the edge of the component 10 towards the center thereof. The resin input ports 14 and vacuum output ports 16 are positioned according to the direction of resin flow is desired. Additionally, any number of resin input ports 14 and vacuum output ports 16 may be used to accomplish resin flow. In the exemplary arrangement shown in FIG. 1, a plurality of resin input ports 14 are spaced generally adjacent to a perimeter region 18 of the body structure 12 with one vacuum output port 16 formed at a central region 20 of the body structure 12 and optionally connected via the vacuum distribution channel 21 to any number of other vacuum output ports. FIG. 2 also shows the general pathway of resin into the system 200 (i.e., with arrow I) to flow across and through a fiber lay up positioned on the base mold surface 102 and thereby impregnate the fiber to form a part P in the space 300, and the pull of the vacuum out of the system 200 (i.e., with arrow O) to provide the negative pressure adequate for the desired resin flow and remove air present in the space 300.

The flexible molding component 10 is engineered out of materials that provide significant advantages when compared to traditional "B" surface tools (e.g., vacuum bags), achieving in a closed molding tooling system the fabrication of a part with high fiber-to-resin ratios. With such ratios, composite parts may be made stronger and lighter, which are highly desirable characteristics for boat hulls, aircraft frames, and other moving objects. The component 10 is preferably formed of materials such as polyurea, polyurethane, a polyurea/polyurethane compound, or other materials with similar physical characteristics, including—unlike tooling components made from polyester—a lack of natural bonding with resins used in the composite part fabrication process. These materials may also be of the aromatic, aliphatic or polyaspartic form. If the component 10 materials are of the aliphatic or polyaspartic form, then ultraviolet light (UV) curing of the laminates or gel coats used in the resin/fiber combination to form the part P may be conducted within the space 300 of the system 200 without damaging the integrity of the component 10. The component 10 may be made in accordance with the disclosure of co-pending application Ser. No. 10/795,858, to Robert F. Mataya, et al., filed Mar. 8, 2004 and entitled Closed Molding Tool, the entire disclosure of which is incorporated herein by reference. UV curing is often desirable because of the fast cure times of the part P and reduced chemical emissions as compared to traditional curing methods employing a catalyst. Polyurea, polyurethane, and polyurea/polyurethane compounds also provide the advantage of being configurable in a tooling component to have a broad range of hardnesses and percent elongation under force. This allows for greater flexibility in part fabrication, including the changing of a fabricated part's dimensional specifications without modifying or replacing the flexible molding component 10.

Various embodiments of the structure of the flexible molding component 10 are shown in more detail in FIGS. 2-7. One resin input port 14 and one vacuum output port 16 are sectioned to show the path of resin flow in the system 200. The flexible body structure 12 is preferably configured to have at least one perimeter seal 22 formed in the perimeter region 18, and, in the embodiments of FIGS. 2-5, a standoff 26 extending from the interfacing surface 17. Alternatively, the perimeter seal 22 could be replaced by an external seal attachable to the flexible body structure 12 in the perimeter region 18.

The standoff 26 extends laterally across the interfacing surface 17 generally for the width of the flexible body structure 12 and has a set of recessed passages 28 formed therein. The function of the standoff 26 is to provide support to the body structure 12 when the vacuum is applied thereto such that the structure 12 is not drawn so tightly against the base mold surface 102 that resin flow from the resin input port 14 to the vacuum output port 16 via the resin distribution channels 19 and vacuum distribution channels 21, across and through a fiber lay up, is not impeded. The passages 28, therefore, are needed for the resin to pass through the standoff 26 and flow in the direction of the vacuum draw. Those of skill in the art will appreciate that resin and vacuum distribution channels 19, 21 layouts other than those shown in FIGS. 4-6 may be implemented with system 200 and used in conjunction with the standoff 26 depending on the specific flow characteristics desired for the resin.

Figure 3:
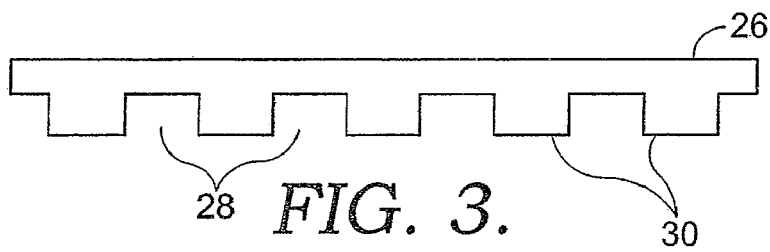
FIG. 3 shows a close-up view of the passages of the standoff.

One exemplary standoff 26 arrangement is shown in FIG. 3 formed by downwardly extending teeth 30 of the standoff 26 defining the set of laterally extending passageways 28; however any form of passageway, such as apertures extending through the standoff 26, may be implemented so long as the standoff structure (e.g., teeth 30) is rigid enough to support the integrity of the passageways 28 when a vacuum is applied to the body structure 12 and the passageways 28 have a sufficient cross-sectional area as to allow enough resin to flow to the fiber lay up in a set amount of part fabrication time.

Figure 7:
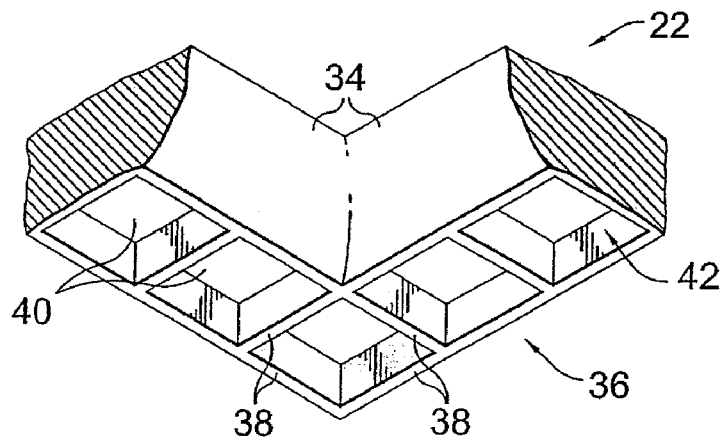
FIG. 7 is a bottom perspective close-up view of one embodiment of the perimeter seal.

The perimeter seal 22 extends completely around the perimeter of the body structure 12 to sealingly engage the base mold surface 102 and form the space 300 containing the materials for the part. The seal 22 is essentially a downward extension 32 from the body structure 12 transitioning from a sloped surface 34 to an abutting surface 36. The abutting surface 36 can be a flat surface or other surface shape having a contour that is the same as the contour of the base mold surface in that region, or as shown in FIG. 7, the surface 36 may be formed as a grid of sidewall flanges 38. These flanges 38 are formed by recessing areas 40 of the seal 22 to create a series of voids 42. Upon drawing of the vacuum in the system 200, the flanges 38 are configured to flex sufficiently enough to have a good seal with the base mold surface 102 to create the negative pressure necessary to move the interfacing surface 24 into solid contact with the part P and the base mold 100, but to have enough rigidity as to not fully collapse into the voids 42 and place excessive compressive forces on the standoff 26, which could impede the flow of resin through the passages 28. The entire perimeter seal 22 may have a consistent modulus of elasticity, or alternatively, regions of the seal above the flanges 38 may have a higher modulus of elasticity than the flanges 38 themselves, which aids in the flexing of the flanges 38 to create an adequate seal. Still further, the flanges 38 and voids 42 create attachment points where various tools may be secured to the molding component 10 to more easily move the component onto and off of the base mold 100.

Figure 4:
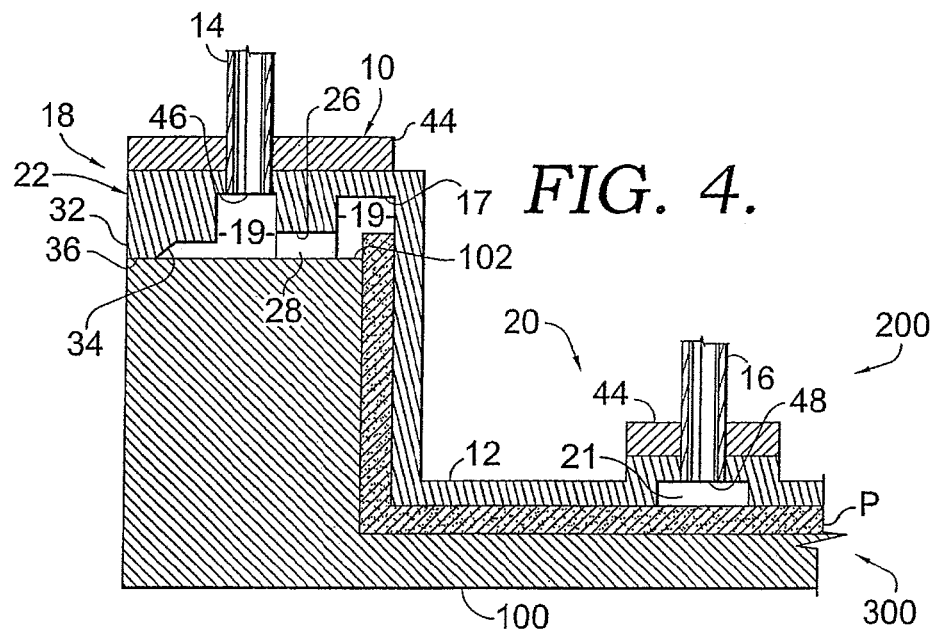
FIG. 4 is a side elevational view of the cross-section of FIG. 2 showing a reinforcement material integrated into the molding component.

FIG. 4 shows another arrangement where reinforcing material 44 is molded or otherwise integrated into the body structure 12 to create regions of the flexible molding component having varying physical properties, for example, varying densities, rigidities, and compression and elongation characteristics. For example, it may be desired for regions adjacent to the resin input port 14 and vacuum output port 16 to have an increased rigidity, such that when the vacuum is applied to the system 200 to sealingly engage the perimeter seal 22 with the base mold 100 and draw the interfacing surface 24 against the resin/fiber combination and base mold surface 102, openings 46, 48 to the input and output ports 14, 16, respectively, remain structurally intact such that adequate resin flow and vacuum pressure is maintained. Examples of reinforcing materials may include metals, such as aluminum, composites, or other materials. The weight of the reinforcing material 44 may also be used to increase the pressure on the perimeter seal 22—based on the surface area of the seal 22 that abuts the base mold 100. Configuring the seal 22 with sidewall flanges 38 further reduces the surface area of the seal 22, and in combination with the reinforcing material 44, work with the vacuum to provide a substantial clamping force with the base mold 100 to further maintain the integrity of the vacuum pressure during the fabrication process and prevent gaseous materials from leaking out of the space 300 and into the surrounding environment. Also, similar to the flanges 34 of the perimeter seal 22, the reinforcing material may provide attachment points where various tools may be secured to the molding component 10 to more easily move the component onto and off of the base mold 100, which is a significant advantage when the component 10 is large.

Figure 5:
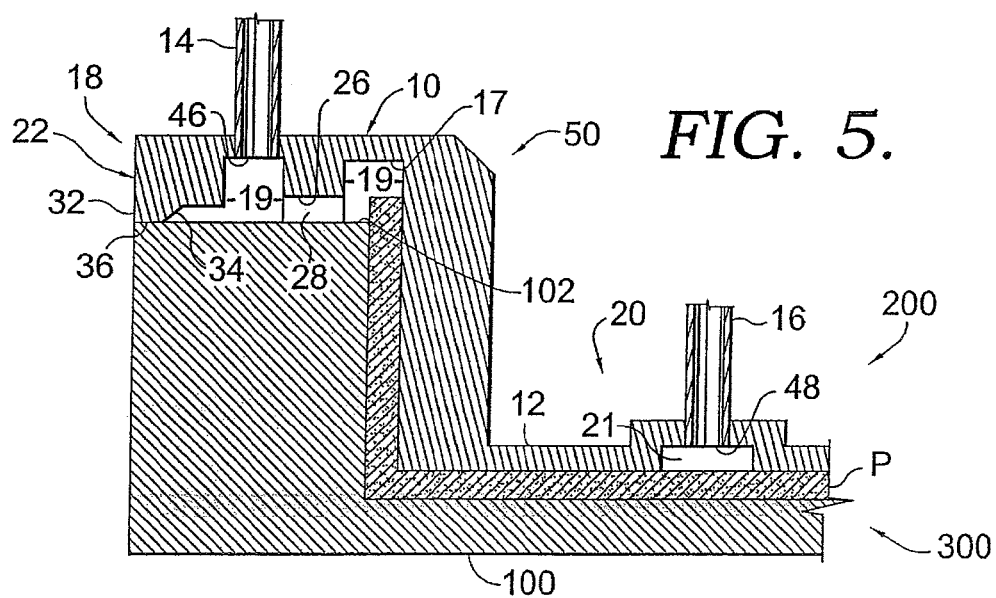
FIG. 5 is a side elevational view of the cross-section of FIG. 2 showing a region of the molding component having an increased thickness as compared to other areas of the component.

Another configuration of the flexible molding component 10 is shown in FIG. 5 where the body structure 12 has a region 50 of increased thickness. This region 50 therefore has varying physical properties as compared to other regions of the body structure 12, and can impart different physical properties onto a region of the fabricated part below the component region 50. For example, by having the increased thickness region 50, the weight thereof forces the component 10 to better conform to the surface contours of the base mold surface 102 immediately below region 50 and thereby more accurately shape the part P to the desired contour.

Figure 6:
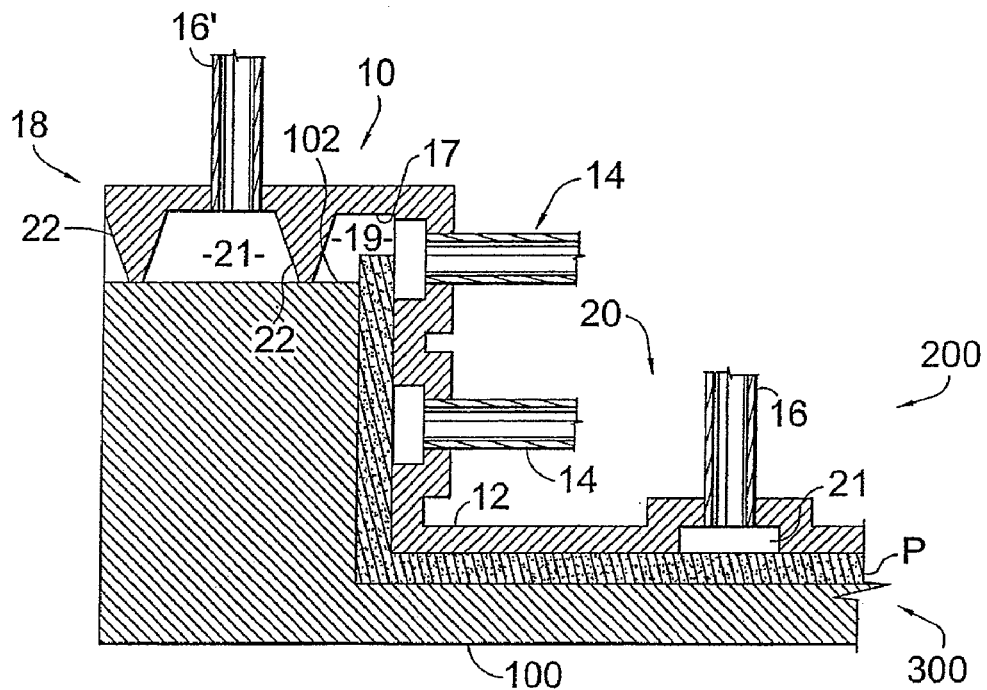
FIG. 6 is a side elevational cross-sectional view of another embodiment of the molding component of the present invention having a double perimeter seal.

FIG. 6 shows yet another embodiment of the flexible molding component 10. This embodiment of the component is similar to that shown FIG. 2, but the body structure is formed with dual perimeter seals 22 extending downward from the interfacing surface 17 preferably in the form of tapered flanges. The resin input port 14 shown in section in FIGS. 2, 4 and 5 is replaced by a perimeter-sealing vacuum output port 16' which is in fluid communication with vacuum distribution channel 21 extending generally around the perimeter of the body structure 12 between the dual perimeter seals 22. Multiple perimeter-sealing vacuum output ports 16' may be positioned to fluidly communicate with the vacuum distribution channel 21. The purpose of the dual perimeter seals 22 configuration is to facilitate the improved locking of the flanges against the base mold surface 102 when the vacuum is applied through the perimeter-sealing vacuum output port 16', because the vacuum draw for the perimeter seals is independent of the vacuum draw by the vacuum output port 16 directing the flow of the resin, it can be set at higher vacuum levels than the resin vacuum port 16. This improved locking or sealing also allows for resin to be introduced through one or more resin input ports 14—which are preferably not in fluid communication with the vacuum distribution channel 21—into the enclosed space 300 at moderate injection pressures to "push" the resin across and through the fiber lay up on the base mold surface 102 in addition to the vacuum output port 16 draw of the resin. This method will thereby increase the speed of part fabrication by moving the resin through the fiber lay up more quickly. As parts become larger, this speed advantage becomes even more pronounced. Further, as with the perimeter-sealing vacuum output ports 16', multiple resin input ports 14 may be provided on the body structure 12, and with resin distribution channels 19, for better resin distribution as needed.

It should also be understood that the flexible molding component 10 may also be used to produce fiber reinforced composite parts without injecting or otherwise introducing the resin between the body structure 12 and the base mold 100 through the resin input ports 14. Instead, the resin may be poured, rolled or sprayed onto the fiber lay up lying on the base mold surface 102 using well-known methods, and then the component 10—without resin input ports 14—is moved onto the base mold surface 102 to enclose the resin/fiber combination and the vacuum output ports 16 (or other vacuum means) apply the vacuum draw to remove air and excess resin in the space 300 of the system 200 and formed the finished part P.

Therefore, it can be seen that the flexible molding component 10 of the present invention provides a superior molding tool for reliably producing increased strength fiber reinforced composite parts in a closed molding tooling system 200. The flexible nature of the integrally formed molding component 10 avoids the necessity in the prior art of conducting the labor intensive and exacting process of building up patterns to produce a molding tool that can fabricate a part having a specific thickness. The system 200 can also be used to apply uniform pressure over virtually any size or type of surface that might require such pressure to form the finished P with the desired shape and mechanical properties. This uniform pressure application is made possible by the configurable nature of the resin input ports 14 and vacuum output ports 16—which may be placed at customized locations on the body structure 12—and the flexible nature of the body structure 12.

Figure 8:
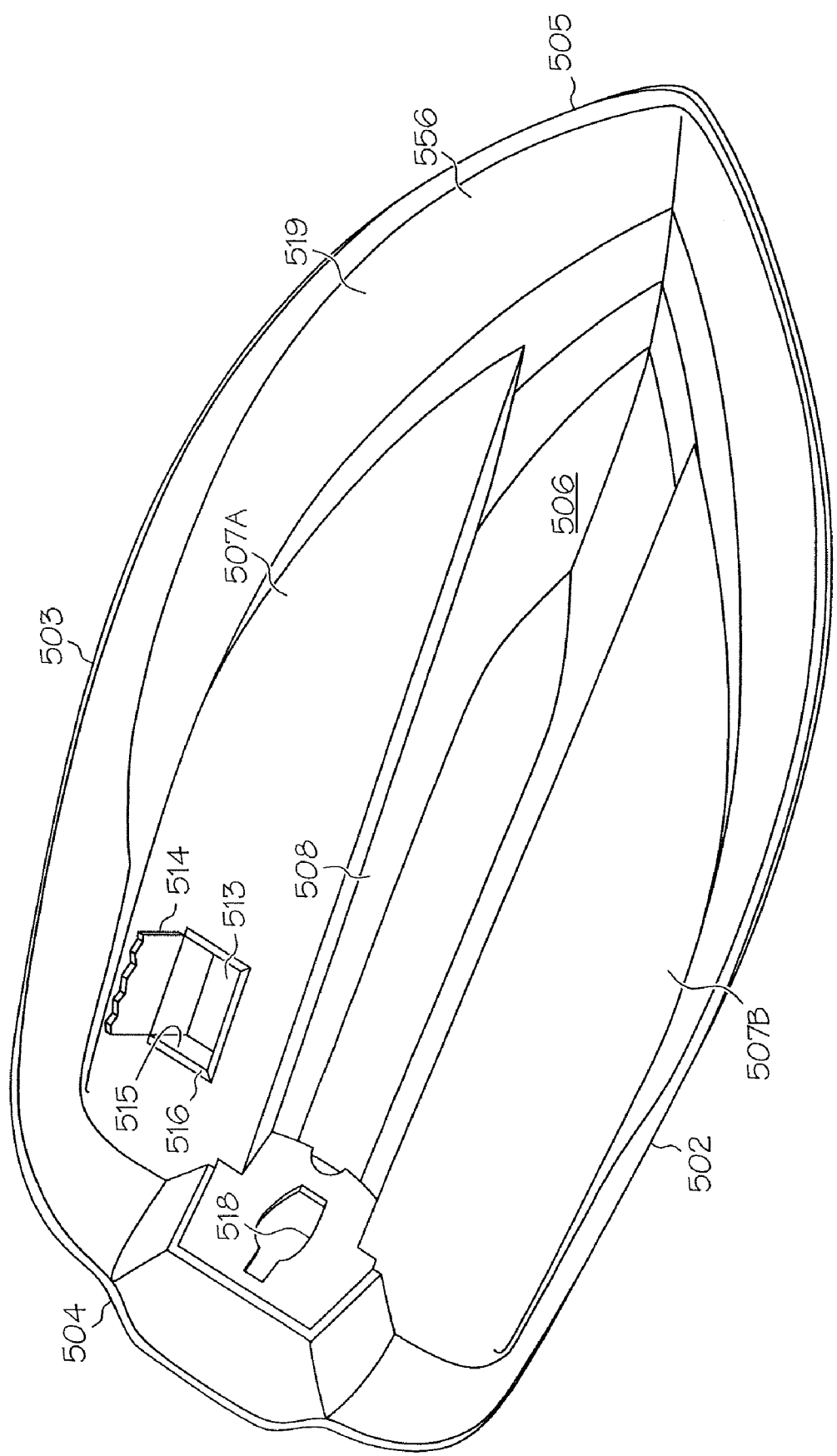
FIG. 8 is a perspective view of a boat hull and working deck viewed from a position generally above the boat hull.
Figure 9:
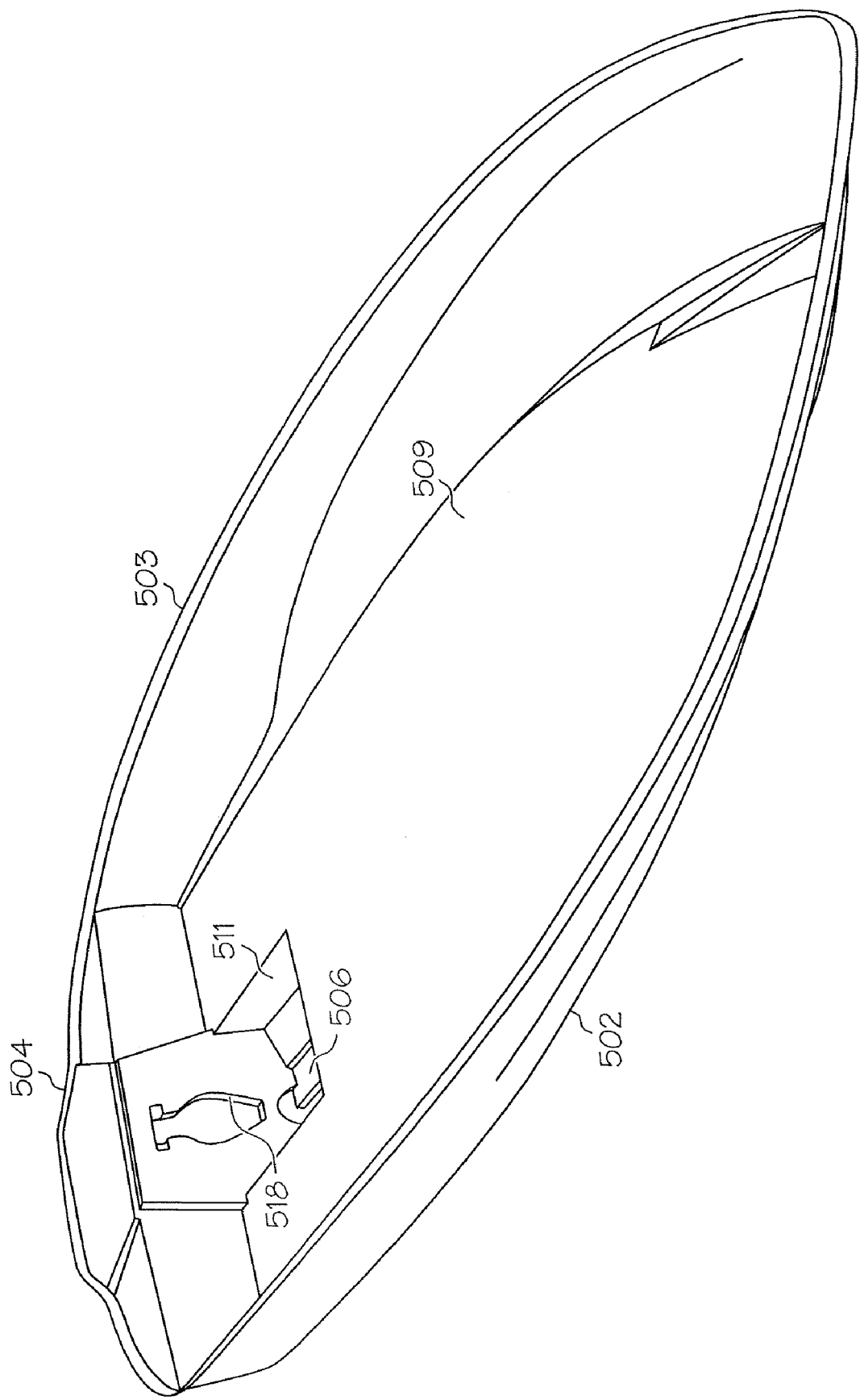
FIG. 9 is a perspective view of a modified form of boat hull and working deck similar to that shown in FIG. 8.
Figure 10:
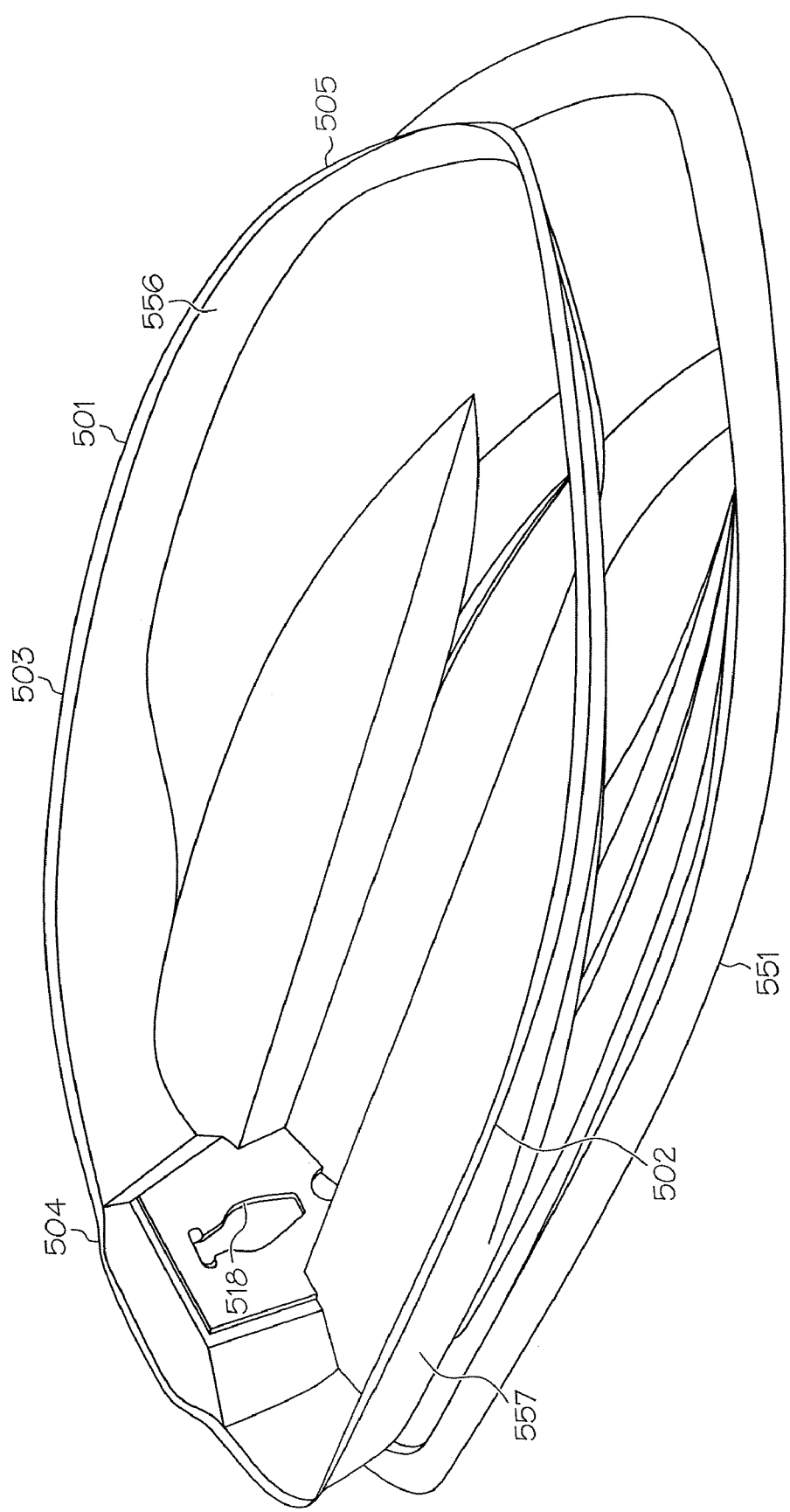
FIG. 10 is a perspective view of a boat hull and working deck shown in an exploded view with a female mold half positioned under the boat hull.
Figure 11:
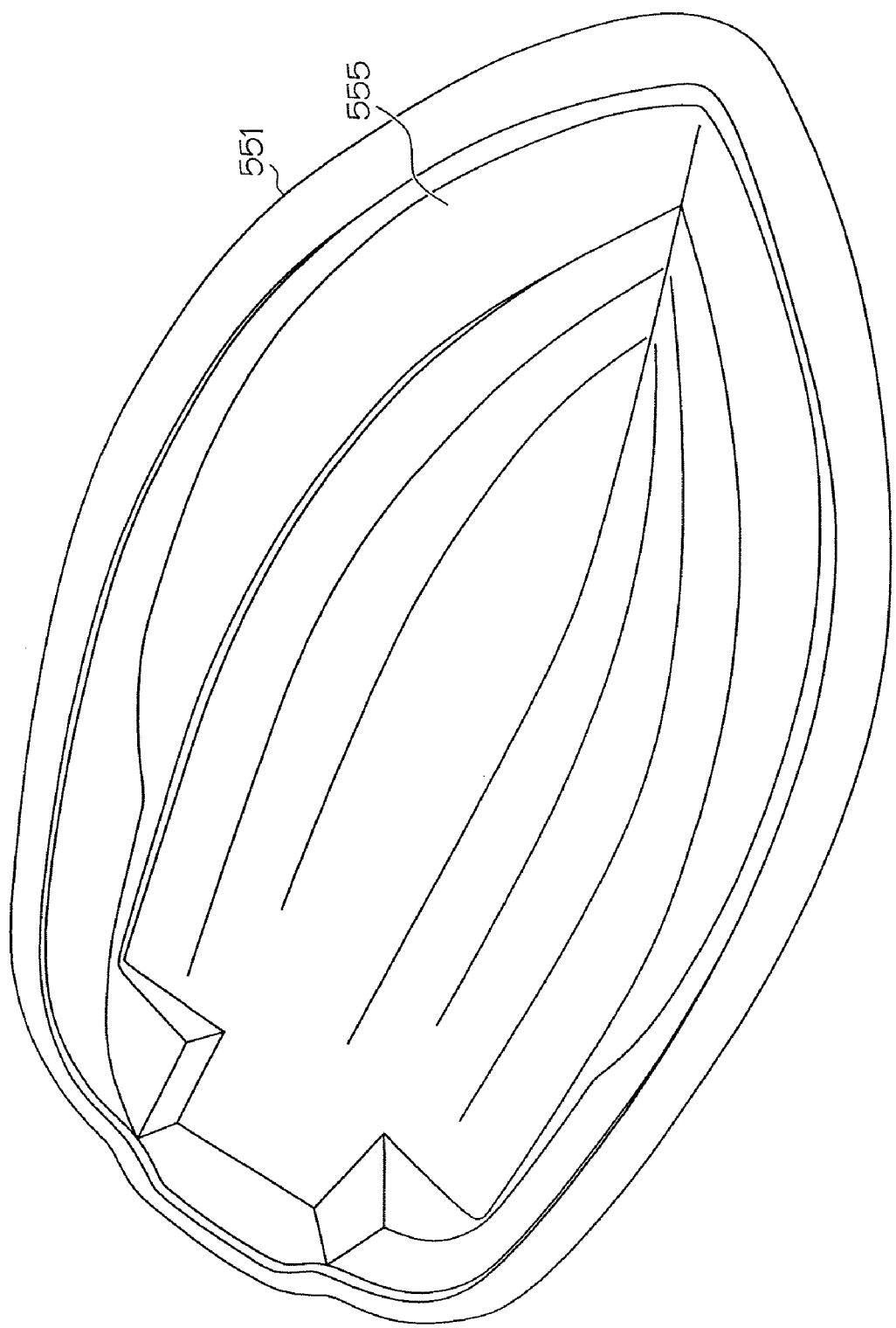
FIG. 11 is a perspective view of a female mold half as viewed from above.
Figure 17:
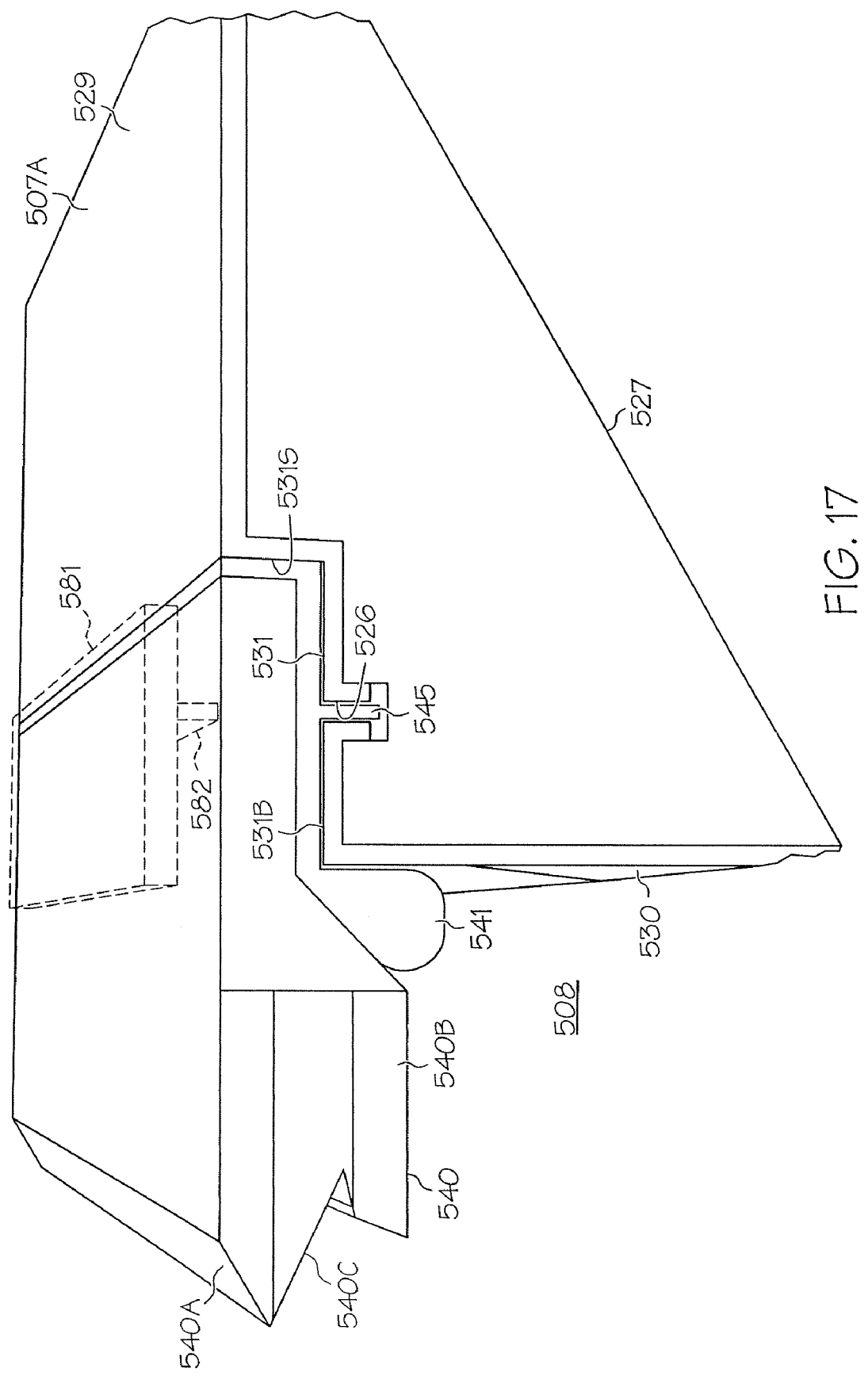
FIG. 17 is a fragmentary cross sectional view of the boat hull and working deck illustrating details of the working deck and floor after formation.

As best seen in FIGS. 8 and 17, a boat hull designated generally 501 is provided. The boat hull 501 has sidewall portions 502, 503, a stern portion 504, a bow portion 505 and a bottom wall portion 506. The hull 501 may also be provided with at least one working deck which is seen in FIG. 8 as including two decks 507A and 507B with a channel 508 therebetween and with uninterrupted wall surfaces forming a portion of the channel. The deck 507 is elevated above the bottom wall 506 in the embodiment shown in FIG. 8. As seen in FIG. 9, a second embodiment of working deck is designated 509 and is at least substantially continuous between the sides 502, 503 and the bow and stern 504, 505. Optionally, a pit 511 may be provided for the mounting of an engine or the like which engine may be used for boat propulsion. A transom for an outboard motor may optionally be provided. The deck 507 or 509 may take one of many various forms and shapes and preferably extends substantially the length of the boat between the stern 504 and bow 505. The deck 507 or 509 may be generally flat on the top and adapted for walking and standing upon and for the attachment of various fixtures, e.g., pedestal seats and may be provided with one or more wells or storage compartments 513 as seen in FIG. 8. The compartments 513 may be utilized for storage of, e.g., fishing tackle, batteries, a live well as desired. A hinged lid 514 may also be provided, as are known in the art, to selectively close the open side 515 of the compartment 513. A ledge 516 may be provided around the open side 515 to support the lid 514 when in its closed position. As seen in FIGS. 8 and 9, a suitable opening 518 may optionally be provided in the stern 504 for providing an inboard-outboard power drive unit for the boat hull 1 as are known in the art. In the embodiment shown in FIG. 8, a drop-in-deck or cover 540 (described below and see FIG. 17) may be utilized to cover all or part of the channel 508 to provide a drop in deck member wherein the channel 508 may also be used for storage. The cover 540 can selectively and/or permanently function as an extension of the decks 507A, 507B providing a continuous deck surface across the hull 501. The channel 508 may also be used as a walkway if it is not used for storage. The surfaces defining the interior of the boat hull 501 define an interior cavity 519 that is upwardly opening. Certain of the members or components which include the cavity defining surfaces are preferably continuous and seamless but may also be provided with discontinuities such as grooves 526 as more fully described hereinafter and provide a seam between the wall 529 and respective adjoining wall 530. The wall 529 is generally horizontal and the wall 530 is upstanding and preferably generally vertical and preferably continuous between opposite ends thereof. The walls 530 are spaced apart and face one another defining opposite sides of the channel 508. The channel 508 may also be used to provide an area for mounting an inboard-outboard power drive unit. The boat hull 501 may also be constructed to eliminate the opening 518 and the boat hull 501 may be provided with a transom for the mounting of an outboard engine if desired. Means may be provided for accommodating an inboard power unit or even a sail to power the boat made from the boat hull 501. Elevated decks are particularly useful in sporting boats such as fishing boats. One or more dividers 575 may be provided in the channel 508 to extend between the deck components 507A, 507B to divide the channel into compartments substantially sealed from one another to function as closeouts as later described. A divider 575 is preferably nonstructural, i.e., providing little to no structural support for the hull 501 but can support the cover 540 if desired.

Figure 15:
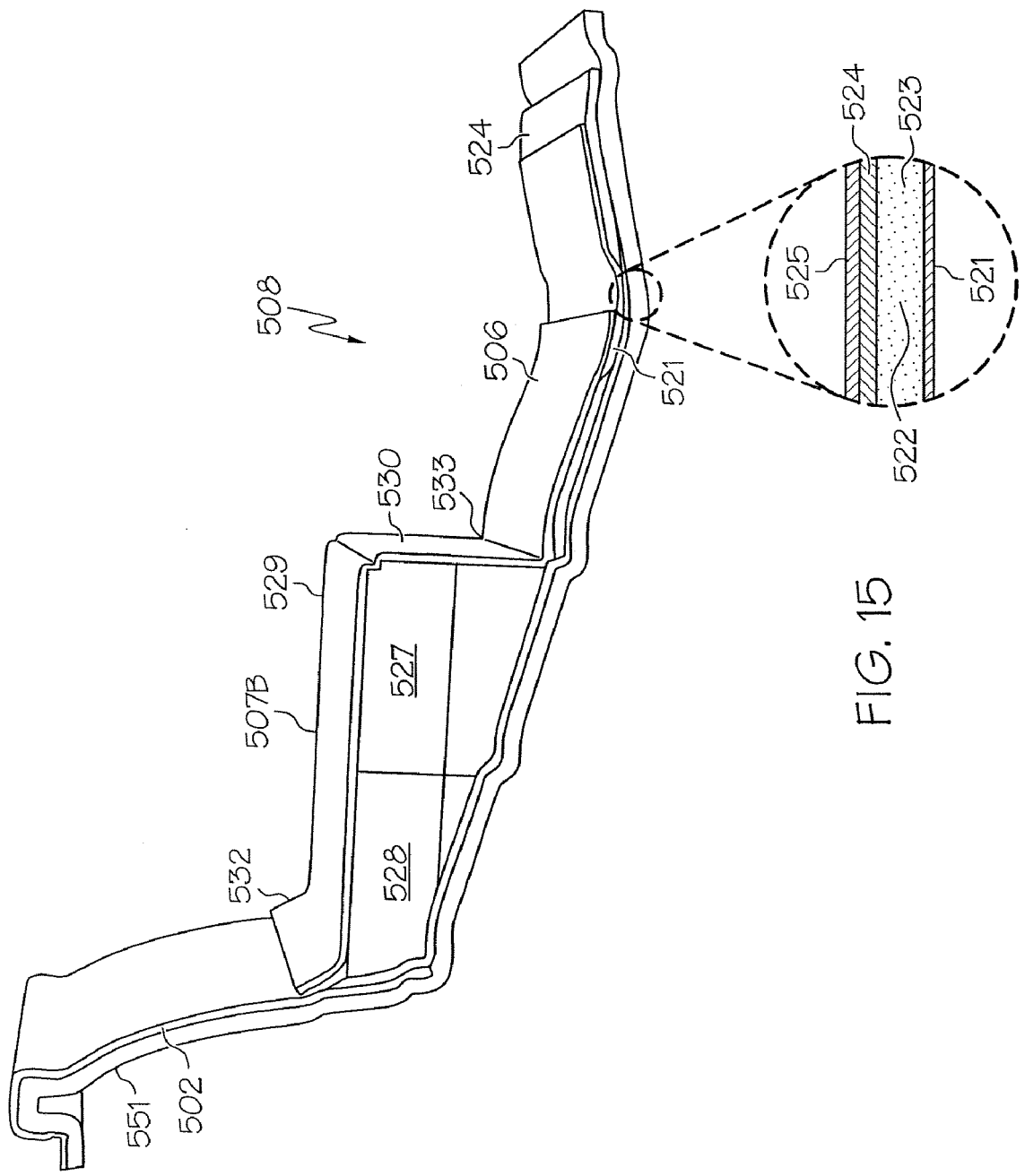
FIG. 15 is a transverse fragmentary sectional view of a portion of the boat hull and female mold half.

As best seen in FIG. 15, the construction details of the boat hull 501 may be seen. The boat hull 501 can include an exterior film 520 which may be in the form of a gel coat or a thermoformed shell which can be provided with appropriate color and surface finish as desired for the particular boat hull. The film 520 is on the outside of the boat and is normally the surface in contact with the water when the boat hull 501 is in use. The boat hull 501 is formed as a laminated structure which includes the exterior film (if any), a layer of fibrous material 522 which is structural reinforcement to provide strength to the boat hull 501. The fibrous material 522 is impregnated or infused with resin 523 to bind the fibers together in fixed relationship. The resin 523 may be any suitable resin, as disclosed above, which will flow into the interstitial spaces between the fibers comprising the fibrous material 522. Such resins are set forth above and when set by curing, e.g., provide binding of the fibers and rigidity of the structure. An optional core 524 such as a balsa wood core may be laminated to the fibrous material 522 to provide both thickness and rigidity as well as flotation. An additional resin impregnated fibrous layer 525 may also be provided on top of the core 524, if a core is used, to further strengthen the hull construction and to provide added thickness and hence increased rigidity.

An insert 527 may be provided to integrally form each of the chambers 528 between the walls 529 and 530, the respective side walls 502 or 503, stern 504, bow 505 and a portion of the bottom wall 506 of the hull 501 as applicable. The chambers 528, when formed, are water tight with the walls 530 thereof functioning as stringers. In a preferred embodiment, the insert 527 is made of relatively rigid closed cell polymeric structural foam. The properties of the insert 527, whether the insert(s) is/are used to make a plurality of working decks or a single working deck, may be selected to not only provide buoyancy and to help form a respective chamber 528, they can also be selected to provide significant structural integrity and strength to the finished boat by providing at least increased moment of inertia and resistance to the flexure of the walls 529, 530 and other hull components. During the molding process, the exterior surface of an insert 527 is bonded to the walls 529 and/or 530 in the hull 501 to form a composite working composite structural element or the like. The insert 527 is preferably bonded to at least the walls 529, 530 and preferably to at least portions of the other hull components contacting it, e.g. a sidewall 502 and/or 503 stem 504, bow 505 and bottom wall 506.

The bond between an insert 527 and the walls 529, 530, sidewall 502 and/or 503, stem 504, bow 505 and bottom wall 506 is continuous and preferably covers the entirety of the mating surfaces thereby forming a larninated working structural element. The bonding of the parts to form a working structural element can provide increased moment of inertia to the hull 501 in three orthogonal axes, X, Y and Z. The walls 530 are continuous along their longitudinal length from the stem 504 to bow 505. There are preferably no discontinuities or significant stress risers, e.g. sharp notches or changes in contours except at the junctions with other hull components, e.g., between the bottom wall 506 and the wall 530. Structural integrity is provided without the need for integral transverse members or bulkheads such as those required in U.S. Pat. No. 6,367,406 discussed above. The walls 530 are preferably generally planar or may be gently curved along one or more axes. The wall 529 may be similarly constructed except at the edge portion adjacent the wall 530 in the area of the respective recess 531 and groove 526. The walls 529, 530 and the other just mentioned hull components may be made thinner by such construction while providing a stronger and less flexible hull. Thinner layers of resin and fibrous material may be used in the hull components such as the walls 529, 530 sidewalls 502, 503 etc. to form the described hull 501 making the hull 501 lighter in weight to improve boat performance for a given motor but nevertheless strong and durable.

The insert 527 may also be provided with grooves or recesses which may be provided with fibrous material to form internal and integral reinforcing ribs attached to the inside of the walls 529, 530. The above described properties can be selected to provide any desired set of properties for the deck and connected hull wall portions. The delamination strength of the insert 527 may also be selected to help prevent breakage of the insert during flexure (which will induce compression and/or tension), compression and/or tension. The insert 527 may also be used to produce tension in parts of the hull 501, and in particular those components defining the chamber 528 like the walls 529, 530, sidewalls 502, 503 and bottom wall 506.

The insert 527 may be a closed cell foam or an open cell foam which could have an impervious skin enveloping an open cell interior. The insert has a density of less than about 8 lb/cu ft and a tensile strength of at least about 80 psi. With these properties and with proper bonding to the sidewalls 502, 503, bottom wall 506 and walls 529, 530 to the insert 527, the thickness of the walls 502, 503, 506, 529, 530 may be reduced at least about 50% over current thickness which can reduce the weight of the hull 501 by about 20% over a current equivalent hull 501. The bond strength of the walls 502, 503, 506, 529 and 530 to a respective insert 527 is at least equivalent to the tensile strength of the insert. Wall thickness may be reduced by about 50% utilizing the disclosed structure which can reduce hull weight by about 20% which would be about 250 pounds for a typical 18 foot runabout hull. Such weight reduction, without sacrificing the structural integrity of the hull, can have many beneficial effects in both transporting and operation of a finished boat (less weight to tow and less horsepower to operate etc.).

As best seen in FIG. 17, a recess 531 is preferably formed between each of the walls 529 and respective wall 530 to provide for the installation of one or more drop-in-deck(s) or cover members 540 to cover the channel 508 between the walls 530. The cover member 540 may be a laminated structure having a core 540C such as a polymeric foam or balsa wood core laminated and secured to outer layers of resin and fibrous material 540A and 540B to increase strength and resistance to bending (FIG. 17). The recesses 531 may each be provided with a respective groove 526 that separates a wall 529 from a respective adjacent wall 530 with the grooves 526 also preferably extending into the insert 527 to provide a discontinuity 545 and seam between walls 529 and 530. A recess 531 may be defined by a bottom wall portion 531B and sidewall portions 531S. There is a discontinuity 545 in the fibrous material at each of the grooves 526 and the grooves preferably extend the length of the respective deck. A seam is formed by the groove 526. Cover (deck) 540 may be secured to the boat hull 501 over the channel 508 between the walls 530 forming a floor or deck extension portion. The cover 540 has side edge portions which rest in the recesses 531 and are secured to the walls 531B and or 531S and hence the decks 507 as with adhesive 541. The recesses 531 and grooves 526 extend longitudinally along the walls 529, as best seen in FIG. 17. The shape of insert 527 is suitable to conform to the desired shape of the boat hull 501 and provide the desired shape and size of deck 509 and decks 507 including walls 529 and 530. The grooves 526 may also be used to secure fasteners, such as hinges, in place preferably in a recessed manner should hinged mounting of the cover 540 be desired. When the mold half 551 is to be positioned for molding, it will overlie a structural member 581 which has a flange 582 that is positioned in a respective groove 526 to locate and form the respective recess 531 and the walls 531B and 531S. The structural member 581 functions as a mold insert and may be in the form of an elongate T in transverse cross section and is shown in phantom in FIG. 17 providing for high precision molding of the walls 531B, 531S and the intervening outside corner with the wall 530. The flange 582 for forming a groove 526 may be part of a structural angle or T and may be made of an aluminum alloy. Fibrous material may be positioned at the grooves 526 on opposite sides thereof and still have a discontinuity providing a seamed connection and increased strength adjacent the walls 530.

As indicated above, the walls 529 and 530 are preferably formed of a resin impregnated fibrous material such as that used in the composite of fibrous material 522 and resin 523. The fibrous material utilized in the layup may be chopped fibers or a woven or knit fibrous sheet or even a felted fiber sheet or combinations thereof. Such are well known in the industry. A wall 529 is joined to the sidewall 502 or 503 in a manner to provide a seamless integral connection at 532 which is more fully described below in the description of the method of making the boat hull. It is also preferred that there be a seamless connection between the bottom portion of wall 530 and bottom wall 506 of the hull 501 at 533. Although, as shown in FIG. 15, distinct layers in the composite are shown for the sake of drawing clarity, when the resin 523 is infused into the fibrous material 522 to form the boat hull 501, a single layer is formed where the various layers are joined together and contiguous. However, if the optional core 524 is used, the core 524 will separate the laminant into distinct but integrally joined layers with the core 524 being bonded to the adjoining layers. The core 524 is preferably utilized in the lowest part of the bottom 506 to provide added bottom thickness and rigidity. Where the layers 523 and 525 join back together at the side edges of the core 524, the various layers again become a single layer joined in a seamless manner. Alternately, the core 524 may extend to the insert 527 whereby there is a seam between the bottom of wall 530 and hull 501. Balsa wood has been found acceptable to be used as a core 524. The core 524 may also be formed as part of insert 527. It is to be noted that multiple layers of fibrous material 522 may be provided particularly when the fibrous material 522 is in the form of a sheet of interconnected fibers.

As is well known in the art, the exterior of the boat hull 501 may be of any suitable size, shape and color. As discussed above, the interior may take one of many forms but provides at least one working deck and at least one chamber 528. Various cross sectional shapes of the boat hull 501 may be provided as well as a variety of stern 504 constructions and bow 505 shapes may also be provided.

Figure 12:
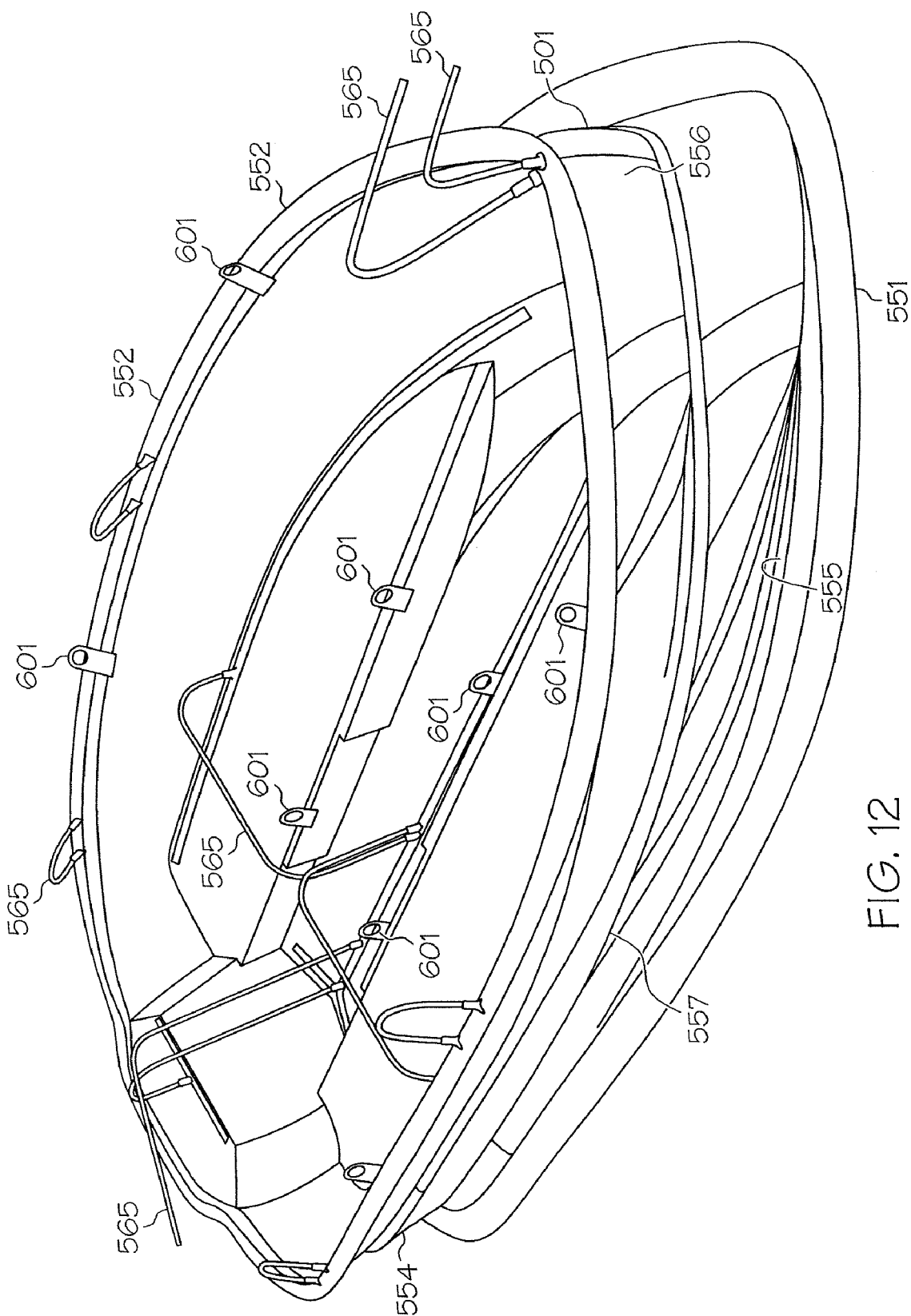
FIG. 12 is an exploded view showing a female mold half, boat hull and working deck and male hold half as viewed generally from above.
Figure 13:
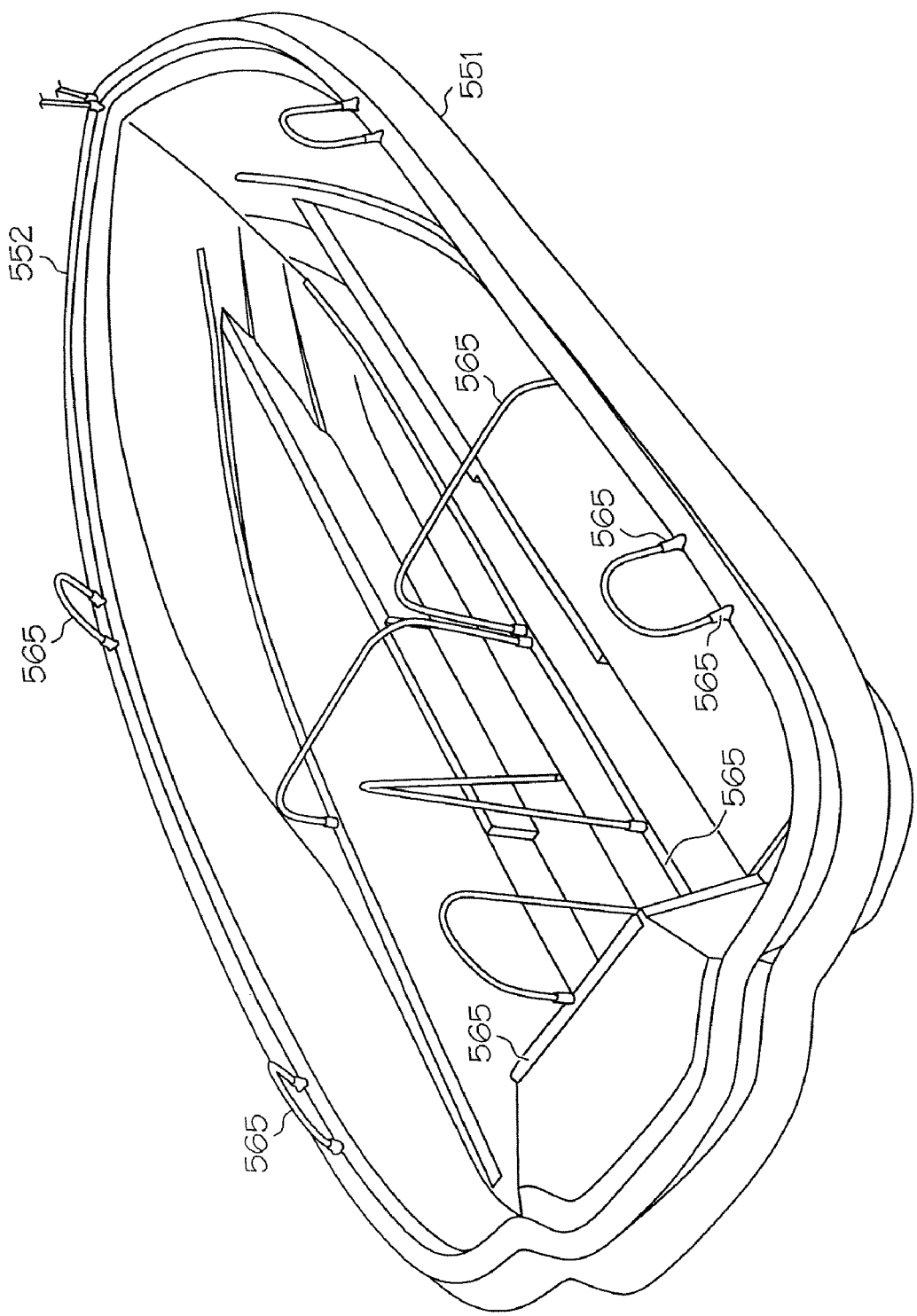
FIG. 13 is a perspective view of male and female mold halves shown in a molding position.
Figure 14:
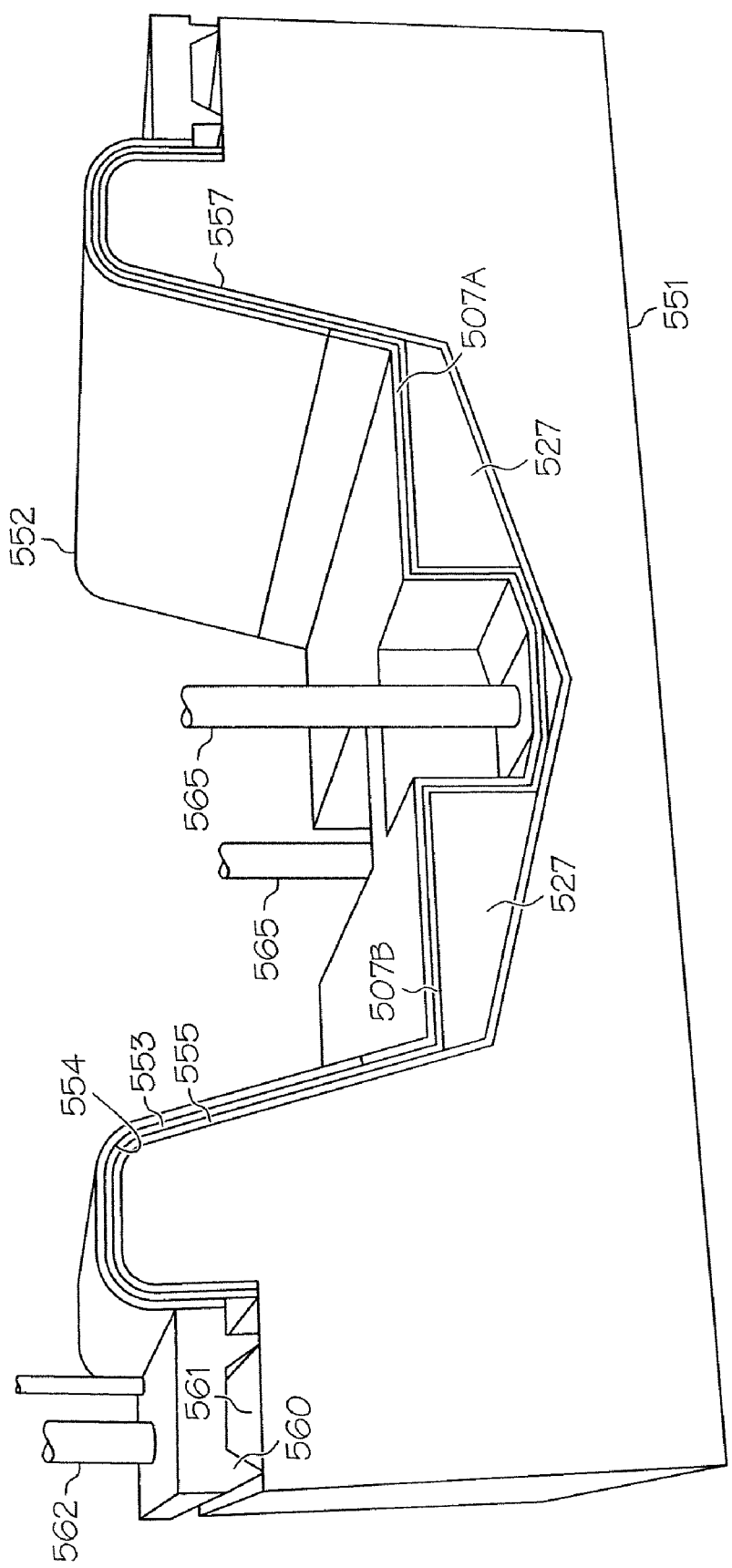
FIG. 14 is a fragmentary sectional view taken transversely across the male and female mold halves and the intervening boat hull.

The present invention includes the method of making the boat hull 501 and associated components. Parts of the method have been discussed above. As seen in FIGS. 10-14, suitable mold components are provided. As best seen in FIG. 12, a female or A mold half 551 is provided which is utilized to form the shape of the exterior of the boat hull 501. The mold half 551 is relatively rigid and may be formed of material(s) as described above. A male or B mold half 552 may also be provided and is utilized to help form the interior shape of the boat hull 501. The mold half 552 is relatively flexible and stretchable and can be made of material(s) as described above, such as polyurethane. The exterior surface 554 of the mold half 552 helps form the interior surface 556 of the boat hull 501 while the interior surface 555 of the mold half 551 forms the exterior surface 557 of the boat hull 501. The mold half 552 as seen in FIGS. 12-14 and in particular, FIG. 14, is formed with a fixed but flexible shape particularly for the surface 554. The surface 554 is formed and shaped to conform generally to the desired interior shape of at least a substantial portion of the interior surface 556 of the boat hull 501. Such pre-shaping of the surface 554 prior to the boat molding process has been found particularly useful in forming the decks 507, 509, and their junctions with other portions of the hull 501. The mold half 552 can be made by spray forming over a preform building up the thickness of the material comprising the mold half 552 to the desired thickness. The mold half surface 554 can thus be formed generally to the interior shape of the boat hull 501 with decks 507 or deck 509 eliminating puckers that are not uncommon in some bag molding processes. Further, the practice of the present invention eliminates the step of cutting numerous piece of material to shape and joining the cut pieces together to form a mold half 552. Thus, the mold half 552 has its exterior or molding surface 554 shaped to conform generally to the desired shape of the interior of the boat hull 501 and decks 507 or 509.

In the process of manufacturing a boat hull with interior working deck, the exterior finish component 521 such as the gel coat or a thermoformed member, is placed in the mold half 551 and overlies the interior surface 555. The interior surface 555 is contoured suitably as needed to produce the appropriate exterior 557. It is to be understood however that the exterior portion such as the gel coat 521 may be eliminated if desired. The exterior member 521 may be a gel coat as is know in the art or may be a thermoformed member made from a polymeric material as is known in the art. The mold half 551 is preferably substantially rigid and substantially non-deformable under the working loads applied thereto during the molding process. The mold half 552 is flexible and is deformable under working loads or pressures as described hereinafter to apply force to material in the mold area 553 between the mold halves 551 and 552, to generally conform to at least the exterior shape of the mold half 552 to the interior shape of mold half 551 with the inserts 527 and core 524 and to provide forming pressure to the resin and reinforcement as hereinafter described. Preferably, the mold half 552 is provided with a sealing arrangement as described above so that when the mold halves 552 and 551 are adjacent to one another, a reduced pressure or "vacuum" may be applied in the mold area 553 between the mold halves 551 and 552. As seen, the seal arrangement 560 will selectively engage a seal surface 561 on the mold half 551. The seal arrangement 560 may be configured as described above to achieve a dual vacuum pressure. Air may be withdrawn from the mold area 553 between the mold halves 551 and 552 via a vacuum pump connected to outlet parts 562 providing a lower pressure inside the area 553 formed by the mold halves 551 and 552 and the exterior of the mold halves 551 and 552. The reduced pressure is sufficiently low to induce flow of resin 523 into the area 553 and into the fibrous material 522. The pressure reduction will be dependent on the viscosity of the resin and/or the tightness of the pack of the fibrous material 522. After placing the fibrous material 522 as desired in the mold half 551, to form the exterior or outside of the boat hull 501, the insert 527 and core 524 are suitably positioned in the mold half 551 on the fibrous material 522. The structural member or mold inserts 581 may be positioned on the inserts 527 before or after the members 581 are positioned in the mold half 551 to form a respective groove 526. The insert 527 may be coated with a fibrous material either partially or entirely on its exterior and into any desired groove or recess 531 therein, if any, as desired, for example, by pre-applying the fibrous material forming the walls 529 and 530 and the connection area 532. Preferably insert 527 is solid; however, it is possible that certain portions of insert 527 may be hollow, depending on the configuration thereof. A combination of chopped fibers and fibrous sheets or mats may be utilized if desired. After the fibrous material 522 and other components for the boat hull are appropriately positioned, including the optional core 524 and inserts 527, in a preferred embodiment, the mold half 552 is positioned within the mold half 551. The seal arrangement 560 is moved into sealing engagement with the seal surface 561 and the pressure in the space 553 between the mold halves 551 and 552 is reduced to provide a pressure differential between the mold area 553 or space between the mold halves 551 and 552 and the exterior of the mold halves 551 and 552 (atmospheric pressure). By reducing pressure in the area 553, the mold half 552 will contact the components inside the molding area 553 and apply force to the components in the mold area 553 between the mold halves 551 and 552. Resin 523 is introduced into the molding area 553 between the mold halves 551 and 552 via one or more conduits 565 that are suitably connected together and open into the mold area 553 at suitable locations. The resin 523 will then fill the mold area 553 in the regions that are not occupied by liquid impermeable structural elements, for example, the insert 527 and reinforcement 522. The resin 523 will flow into the interstitial spaces of the fibrous material 522 and around impermeable structural elements. The vacuum may be maintained during hardening of the resin. Inlet or resin feed valves may be closed when the appropriate amount of resin has been fed to the mold area 553 so no more resin is fed during resin hardening allowing the reduced pressure to be maintained. Thus, a boat precursor with boat hull 501 and working deck(s) 507 or 509 is formed as an integral monolithic structure with the fibrous material 522 and impregnated resin surrounding the insert 527 and core 524 which are precursors for various of the finished elements. The resin is then cured/hardened. After or during the curing step, the vacuum is released and the mold half 552 is separated from the mold half 551 and then the boat hull 501 with working deck(s) 507 or 509 are removed from the mold half 551. Positive pressure air may be introduced to help separate the mold halves 551, 552 from the hull 501. It is preferred that prior to the formation of the boat hull 501, the surfaces of the mold halves 551 and 552 that will contact the boat hull 501 and the members 581, will be coated with a mold release agent such as silicone or the like. The inserts 581 are removed after the mold halves 551, 552 are separated. After the removal of the boat hull 501 from the molding apparatus, the boat hull 501 with working deck(s) 507 or 509 may be finished into a boat. If mold flash is present, it may be suitably removed, the boat may be polished and accessories such as boat seats, windshields, controls and the like may be suitably attached to the boat hull as is known in the art. Also, lids for wells such as the lid 514 may be suitably attached. Additionally, carpeting may be applied to the interior of the boat, e.g., on the deck 507A, 507B or deck 509. A motor and propeller assembly may be installed. Running lights, steering mechanism and the like may be suitably mounted to the finished boat hull. Bumpers may also be installed around the gunnels of the boat. Additionally, a cover may be provided for example over the bow 505 to partially enclose the cavity 519.

Figure 16:
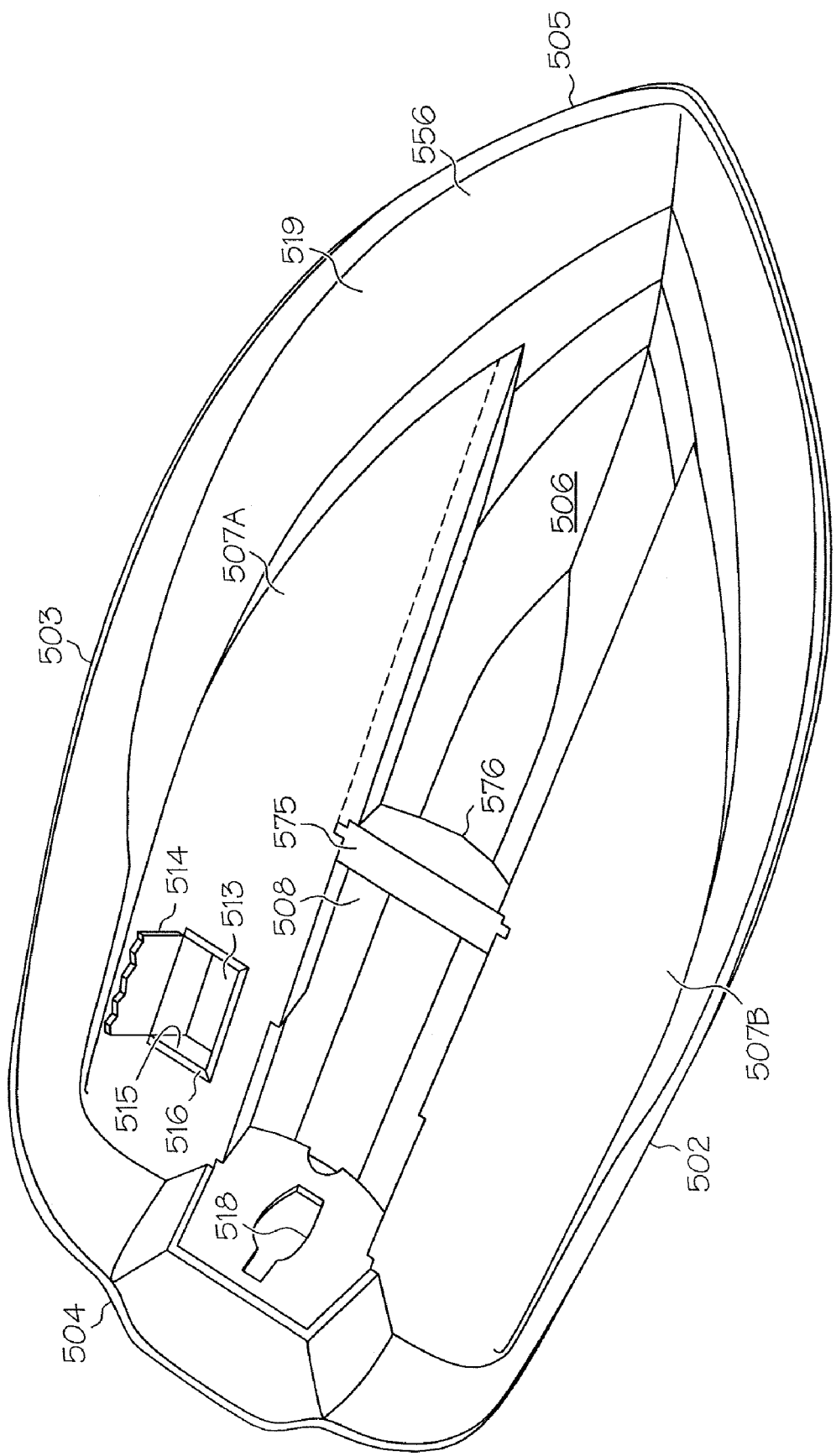
FIG. 16 is a perspective view of an alternative embodiment of a boat hull as viewed from above, with a boat hull, working deck and a non-integral transverse chamber divider.

As best seen in FIG. 16, one or more transverse dividers such as dividers 575 may be positioned and mounted between the walls 530 of the working decks 507A and 507B. In one embodiment, it is preferred that a dividers 575 be positioned within the boat hull 501 after the formation of the boat hull 501 and the accompanying working decks 507A and 507B. By fixing the divider 575 in the hull 501 after formation of the hull 501 and decks 507A, 507B, various positions of the divider 575 can be effected without having to manufacture a new mold providing versatility in the manufacturing process. A divider 575 can function as a closeout to separate the channel 508 into separate chambers and limit migration of fuel and/or fuel vapors and, if desired, provide support for the cover 540. A divider 575 may also be made removable for example by mounting it with rib and groove interengagement providing additional versatility for the finished boat.

As seen in FIG. 12, a plurality of lift attachments 601 such as eyelets are secured to the mold half 552 to assist a lift device in handling the mold half 552.

Thus, there has been shown and described several embodiments of a novel invention. As is evident rom the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of making a boat hull with at least one integral working deck, said method including;
    placing reinforcement in contact with a relatively rigid first mold portion to form a layer of reinforcement for a boat hull precursor,
    placing a working deck forming insert on the first mold portion at a desired location, said insert extending along a substantial portion of the length of the layer of reinforcement for the boat hull precursor;
    placing a relatively flexible second mold portion adjacent the first mold portion capturing the insert and reinforcement in a mold area between portions of the first and second mold portions said second mold portion having a molding surface configured generally to a desired interior shape of the boat hull with at least one working deck;
    reducing pressure in the mold area below atmospheric and thereby compressing at least some of the reinforcement between the two mold portions and thereafter;
    infusing resin into the reinforcement and at least partially enrobing the insert in resin forming an integral boat hull and working deck structure comprised of reinforcement, resin and insert, said integral boat hull and working deck structure having a said boat hull and at least one said working deck with seamless construction between at least one junction therebetween said working deck having a generally upstanding sidewall member defining one side of a channel, said generally upstanding sidewall member extending from a stem portion to a bow portion and being continuous therebetween;
    hardening the resin; and
    removing the integral boat hull and working deck structure from the first mold portion.

2. The method as set forth in claim 1 including placing reinforcement on the insert and thereafter infusing resin into the reinforcement on the insert during the step of infusing into the layer of reinforcement for the boat hull precursor.

3. The method as set forth in claim 2 including forming a pair of said working decks and having said channel therebetween defined on opposite sides thereof by a pair of said generally upstanding sidewall members.

4. The method as set forth in claim 3 wherein the pair of generally upstanding sidewall members both being continuous between the bow portion and the stem portion.

5. The method as set forth in claim 4 wherein the channel is uninterrupted by a transverse partition.

6. The method as set forth in claim 4 wherein the generally upstanding sidewall members are characterized by an absence of a significant stress riser.

7. The method of claim 4 wherein the boat hull includes a pair of exterior sidewall portions, a stern portion a bow portion and a bottom wall portion and each said working deck including a respective said generally upstanding sidewall member and a respective top wall member, each said working deck including a respective said insert, and the method further including bonding each said insert to a respective generally upstanding sidewall member and top wall member, a respective exterior sidewall portion and the bottom wall portion.

8. The method of claim 4 wherein the working decks each including a generally horizontal top wall member and the method further including forming a longitudinally extending recess in each top wall member adjacent a respective said generally upstanding sidewall member.

9. The method of claim 8 including forming a longitudinally extending groove in at least one said recess.

10. The method of claim 9 including forming a seam between a generally upstanding sidewall member and a respective said top wall member at said groove.

11. The method of claim 8 including securing a cover to the formed working decks to extend across and cover at least a portion of the channel.

12. The method of claim 11 wherein edge portions of the cover are each positioned in a respective said recess and being adhesively attached therein.

13. The method of claim 8 including forming a slot in each said deck forming insert and placing a groove and recess forming mold insert into each said slot prior to infusing the resin.

14. The method as set forth in claim 3 including mounting a partition between said generally upstanding sidewall member after the hardening, said partition separating the channel into a plurality of chambers.

15. The method as set forth in claim 8 including placing a pair of said inserts on said first mold portion and forming a pair of working decks with a channel therebetween and mounting at least one divider in the channel between the working decks after the hardening step.

16. The method as set forth in claim 3 wherein the first mold portion being a female mold portion and the second mold portion being a male mold portion, said male mold portion having a relatively flexible portion defining a first side of the mold area and the female mold portion having a relatively rigid portion partially defining a second side of the mold area, the relatively flexible portion having a surface portion defining a portion of the mold area and having a preformed shape conforming generally to a substantial portion of an interior surface portion of the boat hull and working deck structure.

17. The method of claim 16 wherein the relatively flexible male mold portion being used to form a second integral boat hull and working deck structure.

18. The method of claim 17 wherein the relatively flexible male mold portion being made of at least one of polyurea and polyurethane.

19. The method of claim 18 wherein the relatively flexible male mold portion being made by spray forming.

20. The method of claim 18 wherein the relatively flexible male mold portion being made at least partially of polyurethane.

21. A boat hull with working deck produced by the method of claim 3.

22. The method as set forth in claim 2 including coating at least a portion of the first mold portion with boat hull exterior finish and at least a portion of the layer of reinforcement is formed on an interior surface of the exterior finish.

23. The method as set forth in claim 22 said reduced pressure being used to at least partially induce the resin to infuse into the reinforcement layer.

24. The method as set forth in claim 23 wherein the reinforcement layer includes fibers.

25. The method as set forth in claim 24 wherein the reinforcement layer at least partially includes chopped fibers.

26. The method as set forth in claim 25 wherein the reinforcement layer at least partially includes at least one of woven fibers and knit fibers.

27. The method as set forth in claim 24 wherein the resin is hardened by curing.

28. The method as set forth in claim 24 including forming a recess with a groove in the working deck, said groove extending along a substantial portion of the length of the working deck and forming a discontinuity between the generally upstanding sidewall member of the working deck and a portion of the recess.

29. The method as set forth in claim 28 including forming an access opening in a said working deck prior to hardening and mounting a cover over at least a portion of the access opening after hardening, said cover being mounted for movement between open and closed positions.

30. The method as set forth in claim 24 wherein said resin flows into the mold area for the infusing into the reinforcement.

31. The method as set forth in claim 30 including applying reinforcement to at least a portion of an exterior surface of the insert.

32. The method as set forth in claim 31 including applying reinforcement to at least a portion of the exterior surface of the insert prior to placing the insert on the first mold portion.

33. The method as set forth in claim 24 wherein the insert being formed at least partially of a polymeric closed cell foam.

34. A boat hull with working deck produced by the method of claim 24.

35. The method as set forth in claim 2 including forming a wall member on a first face of the insert and a floor member on a second face of the insert, with the wall and floor members comprising resin and reinforcement and said generally upstanding sidewall member being at least a portion of a stringer.

36. The method as set forth in claim 35 including forming a discontinuity in the resin and reinforcement between a top edge of the generally upstanding sidewall member and a side edge portion of the floor member.

37. A boat hull with working deck produced by the method of claim 1.

38. A boat hull with working decks comprising:
hull components including a bottom wall portion, a bow portion, a stem portion and sidewall portions integral with one another and at least partially forming an open top cavity;
a pair of working decks of reinforcement and resin material in the cavity extending a substantial portion the length of the cavity between the bow portion and stem portion each having a respective generally upstanding continuous sidewall member extending from adjacent the bow portion to the stem portion and forming at least one side of a channel, said generally upstanding continuous sidewall members each having a lower edge integral with and connected to the bottom wall portion and being in spaced apart relationship and facing one another forming opposite sides of the channel and each working deck having a top wall member, said working decks each having portions integral with at least two of the bottom wall portion, the sidewall portions, the bow portion and the stem portion forming a structure with an interior surface between a floor portion of the deck and at least some of the hull components, said pair of working decks partially defining respective interior chambers between portions of the respective working decks and at least some of the hull components and an insert in the chambers and attached to portions of the working decks and at least some of the hull components to form a structural element therewith to reinforce the hull;

wherein there is a discontinuity in the reinforcement and resin material between the top wall member and respective generally upstanding continuous sidewall member providing a groove and seam in each working deck; and wherein said chambers are sealed from surrounding atmosphere.

39. The boat hull with working deck of claim 38 including at least one divider extending between and mounted to the working decks and at least partially positioned in said channel.

40. The boat hull with working deck of claim 39 wherein the at least one divider is adhesively secured to the working decks.

41. The boat hull of claim 38 including a generally upwardly facing recess in each working deck adjacent the channel and a floor member bridging at least a portion of the channel and having side edge portions each received in a respective said recess.

42. The boat hull of claim 41 wherein said floor member edge portions each being secured to a surface partially defining a respective said recess.

43. The boat hull of claim 42 wherein each said recess including a longitudinally extending groove positioned adjacent a respective side of the channel and said side edge portions of the floor member each being adhesively secured to a respective said recess surface and overlying a respective said groove.

44. A boat hull with working decks comprising:

hull components including a bottom wall portion, a bow portion, a stem portion and sidewall portions integral with one another and at least partially forming an open top cavity;

a pair of working decks of reinforcement and resin material in the cavity extending a substantial portion the length of the cavity between the bow portion and stem portion each having a respective generally upstanding continuous sidewall member extending between the bow portion and stern portion and forming at least one side of a channel, said generally upstanding continuous sidewall members being in spaced apart relationship and facing one another forming opposite sides of the channel and each working deck having a top wall member, said working decks each having portions integral with at least two of the bottom wall portion, the sidewall portions, the bow portion and the stern portion forming a structure with an interior surface between a floor portion of the decks and at least some of the hull components, said pair of working decks partially defining a respective interior chamber between portions of the respective working decks and at least some of the hull components and an insert in the chamber and attached to portions of the working deck and at least some of the hull components to form a structural element therewith to reinforce the hull.

45. The boat hull with working deck of claim 44 wherein each insert is bonded to a respective said generally upstanding continuous sidewall member, said top wall member and sidewall portions and bonded to the bottom wall portion.

46. The boat hull with working deck of claim 45 wherein the inserts are at least partially made of polymeric foam.

47. The boat hull with working deck of claim 46 wherein the polymeric foam includes closed cell polymeric foam.

48. The boat hull with working deck of claim 45 wherein the generally upstanding continuous sidewall members are characterized by an absence of a significant stress riser and are generally planar.

49. The boat hull with working deck of claim 45 wherein the channel is continuous extending from the stem portion to the bow portion.

50. The boat hull with working deck of claim 49 wherein the bonds are continuous between surfaces of the insert and abutting surfaces of the respective said generally upstanding continuous sidewall, said top wall member and sidewall portions and said bottom wall portion.

* * * * *